(12) United States Patent
Ward

(10) Patent No.: US 11,305,869 B1
(45) Date of Patent: Apr. 19, 2022

(54) SYSTEMS AND METHODS FOR AIRCRAFT LIFT ENHANCEMENT

(71) Applicant: WAYFARER AIRCRAFT RESEARCH AND DEVELOPMENT INC., La Mesa, CA (US)

(72) Inventor: Byron Ward, La Mesa, CA (US)

(73) Assignee: WAYFARER AIRCRAFT RESEARCH AND DEVELOPMENT INC., La Mesa, CA (US)

( * ) Notice: Subject to any disclaimer, the term of this patent is extended or adjusted under 35 U.S.C. 154(b) by 0 days.

(21) Appl. No.: 17/132,187

(22) Filed: Dec. 23, 2020

(51) Int. Cl.
*B64C 23/00* (2006.01)
*B64C 9/24* (2006.01)
*B64C 9/26* (2006.01)
*B64C 27/16* (2006.01)
*B64C 9/22* (2006.01)
*B64C 21/00* (2006.01)
*B64C 9/38* (2006.01)

(52) U.S. Cl.
CPC .............. *B64C 23/00* (2013.01); *B64C 9/22* (2013.01); *B64C 9/24* (2013.01); *B64C 9/26* (2013.01); *B64C 9/38* (2013.01); *B64C 21/00* (2013.01); *B64C 27/16* (2013.01)

(58) Field of Classification Search
CPC ........... B64C 27/16; B64C 9/38; B64C 21/00; B64C 23/00
See application file for complete search history.

(56) References Cited

U.S. PATENT DOCUMENTS

| 1,866,869 A | 7/1932 | Thurston |
| 2,929,580 A | 3/1960 | Ciolkosz |
| 2,950,878 A | 8/1960 | Fowler |

(Continued)

FOREIGN PATENT DOCUMENTS

| EP | 1883576 B2 | 10/2018 |
| GB | 2508023 | 5/2014 |

(Continued)

OTHER PUBLICATIONS

Campbell, John P., "Overview of Powered-Lift Technology," The George Washington University, Joint Institute for Acoustics and Flight Sciences, N78-24047 (1978), 27 pages.

(Continued)

*Primary Examiner* — Nicholas McFall
(74) *Attorney, Agent, or Firm* — Sheppard Mullin Richter & Hampton LLP

(57) ABSTRACT

Systems and methods for increasing lift of an aircraft lifting surface, may include: a leading-edge assembly; a plurality of high-lift propellers, coupled to the slat assembly and configured to be stowed within a compartment of the lifting surface; a high-lift motor to provide motive force to at least one of the plurality of the high-lift propellers; and a deployment linkage configured to move the slat assembly and plurality of high-lift propellers between a deployed configuration and a stowed configuration, wherein in the stowed configuration the high-lift propellers are stowed within the compartment of the lifting surface and at least a portion of the slat assembly covers the compartment of the lifting surface, and in the deployed configuration the high-lift propellers are positioned external to the aircraft lifting surface to direct airflow from the high-lift propellers past the leading-edge assembly.

18 Claims, 27 Drawing Sheets

(56) References Cited

U.S. PATENT DOCUMENTS

| | | | |
|---|---|---|---|
| 2,964,264 A | 12/1960 | Multhopp | |
| 3,018,983 A | 1/1962 | Davidson | |
| 3,121,544 A | 2/1964 | Alvarez-Calderon | |
| 3,154,267 A | 10/1964 | Grant | |
| 3,159,362 A | 12/1964 | Laing | |
| 3,203,649 A | 8/1965 | Girard | |
| 3,289,979 A | 12/1966 | Brunk | |
| 3,478,988 A | 11/1969 | Roed | |
| 3,614,028 A | 10/1971 | Kleckner et al. | |
| 4,398,688 A | 8/1983 | Williams | |
| 10,099,793 B2 | 10/2018 | Ullman et al. | |
| 10,926,868 B1 * | 2/2021 | Ullman | B64D 31/06 |
| 2008/0267762 A1 * | 10/2008 | Jain | B64D 33/02 |
| | | | 415/2.1 |
| 2017/0197700 A1 | 7/2017 | Wainfan | |
| 2018/0162525 A1 | 6/2018 | St. Clair et al. | |

FOREIGN PATENT DOCUMENTS

| | | |
|---|---|---|
| RU | 2637277 C1 | 12/2017 |
| WO | WO 2006/127204 | 11/2006 |

OTHER PUBLICATIONS

Courtin et al., "An Assessment of Electric Stol Aircraft," Thesis submitted to the Department of Aeronautics and Astronautics in partial fulfillment of the requirements for the degree of Master of Science at the Massachusetts Institute of Technology, MIT International Center for Air Transportation (ICAT), Report No. ICAT-2019-13, Aug. 2019, 139 pages.

Courtin et al., "Flight Test Results of a Subscale Super-Stol Aircraft," 2020 American Institute of Aeronautics and Astronautics (AIAA) Scitech forum, MIT International Center for Air Transportation (ICAT), Department of Aeronautics & Astronautics, Massachusetts Institute of Technology, Report No. ICAT-2020-01, Jan. 2020, 16 pages.

Diehl, W. S., "Technical Note No. 25: Center of Pressure Coefficients for Aerofoils at High Speeds," National Advisory Committee for Aeronautics, Apr. 1922, 6 pages.

Harris, Franklin D., "Introduction to Autogyros, Helicopters, and Other V/STOL Aircraft—vol. III: Other V/STOL Aircraft," National Aeronautics and Space Administration, Ames Research Center, Nov. 2015, 810 pages.

Mason, W. H., "High-Lift Aerodynamics," Configuration Aerodynamics, Apr. 5, 2007, 22 pages.

Pieper, Kyle Chapman, "Design, Development and evaluation of a Distributed Electric Propulsion Testbed Aircraft," Thesis submitted for the degree of Master of Science in Aerospace Engineering in the Graduate College of the University of Illinois at Urbana-Champaign, 2018, 147 pages.

Rudolph, Peter K. C., "High-Life Systems on Commercial Subsonic Airliners," National Aeronautics and Space Administration, NASA Contract Report 4746, Contract A46374D(LAS), Sep. 1996, 166 pages.

Schey et al., "Technical Notes No. 406: The Use of Large Valve Overlap in Scavenging a Supercharged Spark-ignition Engine Using Fuel Injection," National Advisory Committee for Aeronautics, Langley Memorial Aeronautical Laboratory, Washington, Apr. 1932, 19 pages.

* cited by examiner

SYSTEMS AND METHODS FOR AIRCRAFT LIFT ENHANCEMENT

TECHNICAL FIELD

The disclosed technology relates generally to aircraft, and more particularly, some embodiments relate to a high-lift assembly for aircraft to enhance lift force.

DESCRIPTION OF THE RELATED ART

An aircraft lifting surface, such as a wing, is designed to create a lift force perpendicular to the direction of motion. Any force along the direction of motion is called drag, which is an unavoidable but generally undesirable byproduct of creating lift.

An airfoil is a 2D cross section of a wing or other lifting surface, and because the fundamental aerodynamics of wings and airfoils are the same or closely related the terms will be used interchangeably except where noted. The lift equation is:

$$L = \frac{1}{2} * \rho * V^2 * S * C_L.$$

Where L is lift, S is wing area p is air density, $V^2$ is airspeed squared (airspeed*airspeed) and $C_L$ is 'lift coefficient' which is configuration dependent.

The quantity $\frac{1}{2}*\rho*V^2$ is collectively referred to a 'dynamic pressure' and given the symbol q:

$$q = \frac{1}{2} * \rho * V^2.$$

Dynamic pressure is displayed to pilots as a 'calibrated' (CAS) or 'equivalent' (EAS) airspeed, which have some differences at high speeds that are irrelevant to this discussion. The speed an aircraft lifts off and touches down as well as many other reference speeds are typically given to a pilot in terms of calibrated or equivalent airspeed (CAS or EAS), which is actually dynamic pressure q (i.e., it includes the effect of both airspeed and air density even though it is presented as a speed).

For an aircraft to maintain a steady flight path (such as cruise, climb, or descent) the lift must equal total aircraft weight:

$$W = L = \frac{1}{2} * \rho * V^2 * S * C_L.$$

For a given wing/airfoil configuration, the lift coefficient is a function of angle of attack, which is defined as the angle between the wing/airfoil and the direction of motion. Wings have a maximum lift coefficient, $C_{L,max}$, which is reached at some configuration dependent angle of attack. Exceeding the maximum angle of attack is called stall, the angle of attack where $C_{L,max}$ is reached is called the stall angle of attack and the speed is called the stall speed.

Wing loading is the weight of the aircraft divided by the area of the wing (e.g., pounds weight per square foot wing area) and for a steady flight path where lift equals weight:

$$\frac{W}{S} = q * C_L.$$

Wing loading is a very important relationship for aircraft design and provides a fundamental tradeoff between the size of the wing (wing loading) and the slowest airspeed (dynamic pressure) an aircraft can fly. The slower airspeed an aircraft can fly, the shorter the runway required to takeoff and landing. Conversely a higher wing loading is better for cruise efficiency and results in a smaller, lighter wing.

Higher values of wing loading may be achieved by increasing the lift coefficient. For example, to increase the wing loading by 3× while maintaining the same stall speed in EAS (hence dynamic pressure q) requires also increasing the lift coefficient by 3×. On the other hand, maintaining wing loading at similar levels but increasing the lift coefficient can allow a lower takeoff and landing speed, which means a much shorter runway requirement. This would allow operation from short runways, such as those placed in underdeveloped locations as well as those placed in congested urban areas where a runway sized for conventional aircraft are impractical due to the amount of land area required and the cost of such land.

There are many variations on mechanical high lift devices, which increase the maximum lift of the wing for takeoff and landing by changing the shape of the airfoil/wing through various mechanical devices. These devices are usually at the trailing edge (aft end) and leading edge (forward end) of the airfoil/wing. The types and general principle of these mechanical devices has been known since the WW2 era or earlier and so there is little prospect of large improvements in the maximum lift coefficient from passive or mechanical high lift devices, which is on the order of $C_{l,max}$ 3.5 for a full aircraft.

Researchers realized early in the history of aviation (pre WW2) that since the lift of an airfoil/wing is strongly dependent on speed (Lift Equation, supra) that placing the wing in a jet of air moving significantly faster than the aircraft itself would allow high lift to be generated at low speed. The term "jet" as used herein is used herein in the engineering sense to reference a high speed flow of air within a surrounding body of slower moving air, and is not used to refer to the colloquial meaning of a specific type of aircraft engine or aircraft. In theory, if the wing were completely immersed in a jet of high speed air, the lift would be increased by the square of the ratio of speed:

$$C_{L,Blown} = \left(\frac{V_j}{V_\infty}\right)^2 C_{L,Unblown},$$

where $C_{L,unblown}$ is lift coefficient of the wing without blowing, $C_{L,Blown}$ is lift coefficient of the wing with blowing, $V_j$ is the speed of the air in the jet, and $V_\infty$ is the speed of the aircraft (also referred to as freestream).

This jet of fast moving air can be provided by placing the wing in the slipstream of the propeller, in the exhaust of a jet engine, or by ducting high pressure air taken off from a gas turbine engine (bleed air).

Conventional solutions embodying these concepts often use the same engines for cruise as for creating low speed lift and therefore they were created to work with practical arrangements of whatever the optimum engine for cruise would be (turbojet or turbofans for high speed aircraft, propellers for lower speed aircraft). These concepts all work by creating a favorable interaction between the propulsor and the wing, and the fundamental principle is not dependent upon the type of propulsor creating the high-speed jet of air.

Another conventional concept is to tilt or deflect the engines so that the thrust from the engines is directed downward, effectively replacing wing lift at low speed. Some operational examples of this include the Harrier jet (deflected jet thrust) and V-22 Osprey (tilt propeller) as well as the more recent NASA GL-10 'Greased Lightening' (tilt wing). Tilt propeller, wing or thrust deflecting aircraft are able to hover, which requires that the thrust from the engines is greater than the weight of the aircraft (thrust-to-weight ratio T/W greater than 1). In contrast the blown wing concepts exploit favorable propulsion-wing interaction to create high lift at low speeds with thrust-to-weight ratios (T/W) much less than one to allow an aircraft to take off and land at much lower speeds than a conventional aircraft with the same wing loading.

Another concept conventionally used to improve the maximum lift coefficient that may appear similar uses active methods for boundary layer control (BLC) by blowing. The boundary layer is a thin layer next to the surface of the wing where the air accelerates rapidly from zero velocity at the surface to the speed of the surrounding air. Boundary layer behavior is very important for high lift because the stall is driven by the behavior of the boundary layer. Additionally the maximum effective deflection of trailing edge flaps is limited by the ability of the air to follow the contour of the upper surface of the flap, which again is driven by boundary layer behavior.

Active methods for BLC by sucking or blowing air around the wing work on a different scale and with different flow physics than the effects of propulsion-wing interaction described herein. The primary effects of propulsion-wing interaction can be shown to work without considering the boundary layer at all (a simplification called inviscid analysis) while BLC control naturally cannot.

More recently interest has been renewed in blown wing concepts due to the promise of electric or hybrid electric propulsion, as well as advances in analytical capabilities earlier in the design process via computerized simulations. Electric motors are considered nearly 'scale free,' which means that the weight, cost, and efficiency of 10 small electric motors and the associated controls is roughly the same as one large electric motor of the same power. This is in sharp contrast to traditional gas turbine or piston engines, which are penalized by reduced size and would typically have to use ducted air or mechanical power transmission (gearboxes and transmission shafts) to place propulsory around the wing, at considerable cost, weight, and complexity.

BRIEF SUMMARY OF EMBODIMENTS

Embodiments of the systems and methods disclosed herein integrate blowing via high-lift, stowable propellers with a Krueger flap or slat. According to various embodiments, a portion of the lower leading edge surface of the wing pivots forward to form a separate lifting surface in front of the wing (e.g., a leading-edge flap) and a motor is deployed from within the wing (e.g., through an opening created by pivoting the leading edge surface of the wing) to increase airflow past the wing (lifting surface) to increase lift.

An apparatus for increasing lift of an aircraft lifting surface, may include: a leading-edge assembly; a plurality of high-lift propellers, coupled to the leading-edge assembly and configured to be stowed within a compartment of the lifting surface; a high-lift motor to provide motive force to at least one of the plurality of the high-lift propellers; and a deployment linkage configured to move the leading-edge assembly and plurality of high-lift propellers between a deployed configuration and a stowed configuration, wherein in the stowed configuration the high-lift propellers are stowed within the compartment of the lifting surface and at least a portion of the leading-edge assembly covers the compartment of the lifting surface, and in the deployed configuration the high-lift propellers are positioned external to the aircraft lifting surface to direct airflow from the high-lift propellers past the leading-edge assembly.

The leading-edge assembly may include a slat nose and a slat door. A flexible hinge may be disposed between the slat nose and the slat door. In various embodiments, the slat nose and a slat door may be a unitary structure. The slat nose may be configured with a different shape across a leading edge of the leading-edge assembly to at least partially compensate for propeller swirl from the plurality of high-lift propellers. The leading-edge assembly may include a nose and a flap, wherein the nose folds into the compartment in the stowed configuration.

In various embodiments, in the deployed configuration, the plurality of high-lift propellers may be positioned below a chord of the aircraft lifting surface and the slat door extends aft and upward from the plurality of high-lift propellers to direct a slipstream from the high-lift propellers past a surface of the aircraft lifting surface. In the deployed configuration, a gap is provided between a trailing edge of the slat door and the upper surface of the aircraft lifting surface. In other embodiments, there is no gap between a trailing edge of the slat door and the upper surface of the aircraft lifting surface.

The propeller may be pivotably mounted to the leading-edge assembly to enable adjustment of propeller tilt. Alternatively, the propeller may be mounted to the leading-edge assembly via a telescoping driveshaft.

In various embodiments, a mount mounting the propeller to the leading-edge assembly comprises a spring hinge configured to allow the mount to pivot forward in response to the propeller providing sufficient thrust to overcome a force of the spring hinge.

The high-lift propellers may be positioned in front of the aircraft lifting surface and the leading-edge assembly extends behind the high-lift propellers.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not exhaustive and do not limit the disclosure or the disclosed embodiments to the precise form disclosed.

DETAILED DESCRIPTION OF THE EMBODIMENTS

Embodiments of the systems and methods disclosed herein integrate blowing via high-lift, stowable propellers with a leading-edge device such as, for example, a leading-edge flap or slat. In some embodiments, the leading edge device may be implemented as a Krueger flap. According to various embodiments, a portion of the lower leading edge surface of the wing pivots forward to form a leading-edge flap and a motor is deployed from within the wing (e.g., through an opening created by pivoting the leading edge surface of the wing) to increase airflow past the wing (airfoil) to increase lift. Embodiments may be implemented to dramatically reduce the ground roll required for takeoff and landing of an unmodified/conventional aircraft. Depending on the placement, quantity and airflow provided by added high-lift propellers, ground roll for an aircraft can be reduced to approximately 15%-25% of the ground roll required for unmodified aircraft.

Embodiments may be configured to be advantageous in dense areas as well as underdeveloped areas where it is not possible or practical to install runways of lengths suitable for conventional airplanes. Dramatic reductions in ground roll requirements for an aircraft achievable by various embodiments can allow takeoff and landing on very short runways, which may be placed in high density areas like hospitals, malls, university and corporate campuses, office parks, and so on. Decreasing ground roll for small aircraft to approximately 150 feet to 300 feet opens up numerous possibilities for possible landing sites, and begins to put fixed wing aircraft on a closer to equal footing with VTOL aircraft like helicopters. Embodiments may also be configured to enable an aircraft with higher than conventional wing loading to operate from conventional size runways allowing a higher payload, more cruise efficient wing, or both. Also, increasing the maximum lift coefficient, $C_{L,max}$, may achieve other benefits such as, for example, increasing the maximum angle of attack to reduce the stall speed and provide the ability for steeper climbs and descents.

Figure 1:
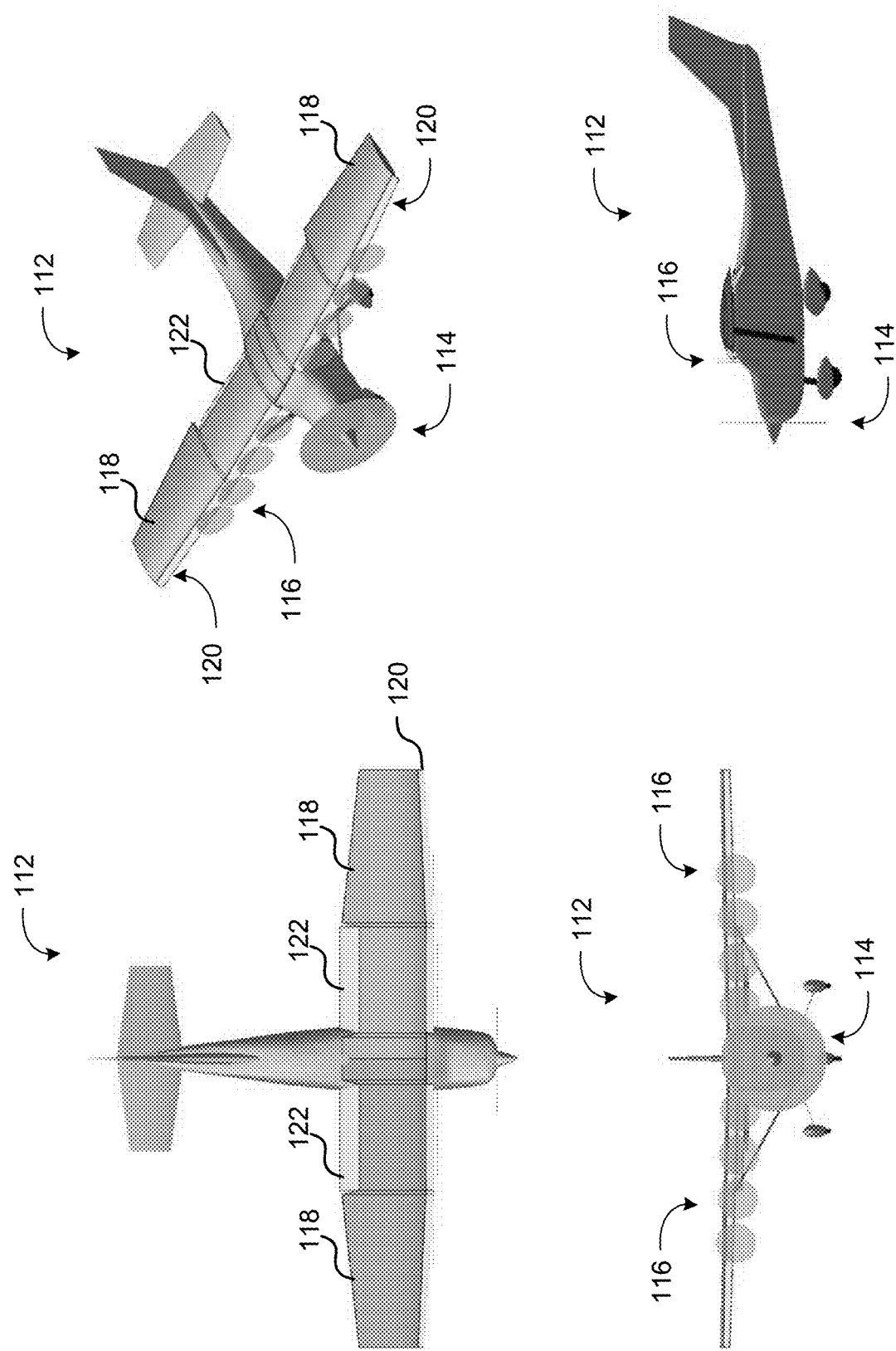
FIG. 1 illustrates an example of a fixed wing aircraft that includes a plurality of high-lift motors/propellers in accordance with various embodiments.

FIG. 1 illustrates an example of a fixed wing aircraft that includes a plurality of high-lift motors/propellers in accordance with various embodiments. The example in FIG. 1 includes 4 views of aircraft 112 with a main propeller 114 and 8 stowable high-lift propellers 116. Main propeller 114 on the nose of the aircraft is exemplary of a typical single-engine design and is used to provide forward thrust for the aircraft. Main propeller 114 may be driven by an internal combustion engine, but, in other applications, may be driven by an electric motor or other source of motive power.

This example shows 8 high-lift propellers 116 (four per side) on the wing of the aircraft. As illustrated, these high-lift propellers 116 are in a deployed state in which they can provide additional airflow over the aircraft wings 118 to increase lift. In various embodiments, high-lift propellers 116 are configured to be stowed within their respective wings 118 and deployed through a leading edge Krueger slat 120. In this example, the outboard wing also uses a Krueger slat 120, but without high lift propellers 116. The trailing edge flaps 122, which span the inboard portion of the wing, are shown deployed in this example.

In other embodiments other quantities of main propellers 114 and high-lift propellers 116 may be utilized. For example, aircraft 112 can be configured as a twin-engine or a quad-engine aircraft having two or four main propellers 114, respectively. Additionally, aircraft 112 can have a fewer or greater number of high-lift propellers 116 then the illustrated example. As a further example, aircraft 112 can include high-lift propellers 116 disposed across the entire leading edge of wings 118. Although illustrated in this example as being placed on aircraft wings 118 to increase lift, embodiments may also or alternatively include a slat 120 with one or more high-lift propellers 116 on other lifting services of the aircraft. This may include, for example, on the aircraft tail (e.g., horizontal stabilizers) or canard (not illustrated in the example of FIG. 1).

High-lift propellers 116 can be driven by one or more electric motors, internal combustion engines, or other source of motive power. In a hybrid aircraft arrangement, main propeller or propellers 114 may be driven by an internal combustion engine and high-lift propellers driven by one or more electric motors. High-lift propellers 116 can be driven by one or more electric motors or internal combustion engines directly or via a gear box and drive shafts. Although the term "motor" may generally refer to an electric motor, the term "motor" as used herein may refer to an electric motor, an internal combustion engine, or other source of motive power that can be used to provide rotational energy to drive one or more propellers.

The example aircraft illustrated in FIG. 1 is a Cessna 182. The high-lift system, including high-lift motors (not shown) and high-lift propellers, shown in this example are sized to enable an extreme short takeoff and landing distance for such an aircraft (e.g., 150 ft), which compares very favorably to the normal takeoff distance for this aircraft. Embodiments may be implemented to reduce the takeoff roll to approximately 20% of the unmodified, conventional aircraft.

The example aircraft illustrated in FIG. 1 is a single-engine, high-wing aircraft with a conventional tail configuration, and includes a 12% thick (thickness/chord) with a forward spar at 15% (position/chord). This is representative of a typical in-service aircraft, but embodiments are by no means limited to this aircraft configuration. As one of ordinary skill in the art will appreciate after reading this disclosure, the technology described herein may be implemented with any of a number of different aircraft types and sizes. The size of the wing, location of the wing structure, quantity of wings, tail configuration, etc. are not intended as limiting, but are shown in the figures to illustrate how components of various embodiments including, for example, a slat assembly, motor, propeller, and engagement mechanism, can be 'packaged' in a real aircraft wing structure. The wing thickness, nose shape, and position of the forward wing spar in particular will influence the design because those features form the compartment in which the high-lift motor and associated mechanism are fitted.

Figure 2:
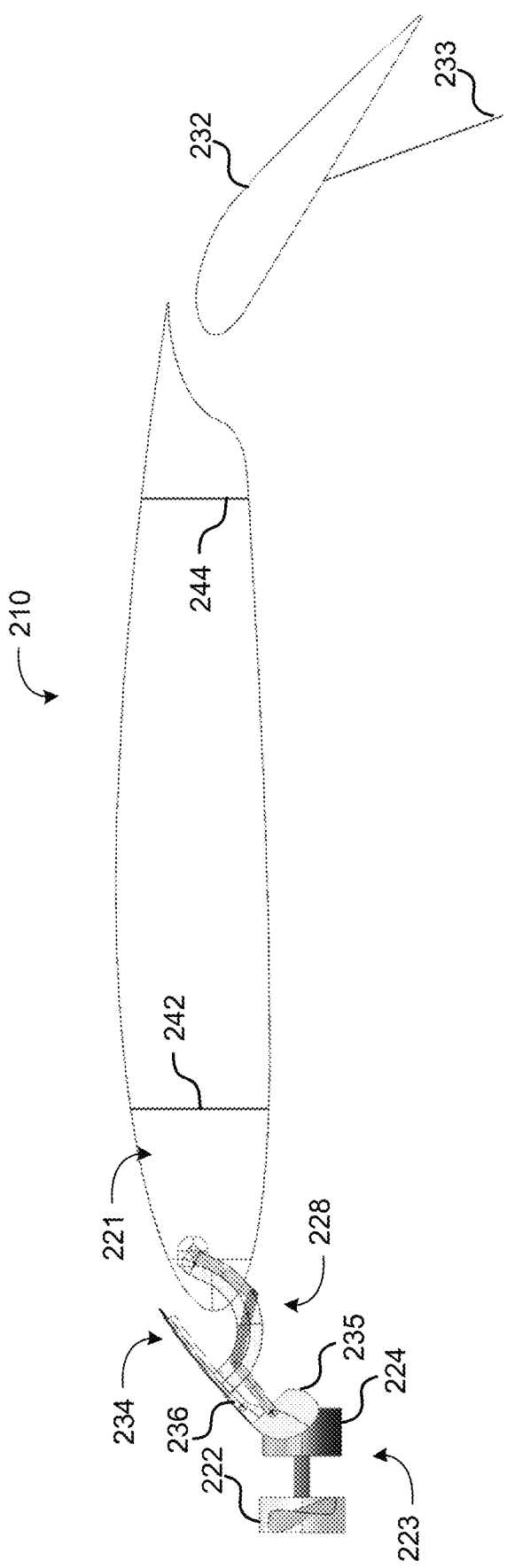
FIG. 2 illustrates a cross-section of an example wing including a slat and high-lift motor mechanism, with the motor deployed, in accordance with embodiments.

FIG. 2 illustrates a cross-section of an example wing including a slat and high-lift motor mechanism, with the motor deployed, in accordance with embodiments of the invention. This example illustrates a wing 210 (e.g. wing 118) with a forward spar 242, an aft spar 244, a Fowler flap 232 at the trailing edge, and an auxiliary split flap 233. A high-lift assembly 223 in this example includes a high-lift propeller 222 (e.g., high-lift propeller 116) and its associated drive motor 224. High-lift assembly 223 is illustrated as being deployed at the leading edge of wing 210, from a storage compartment 221 in the forward section of wing 210. A deployment mechanism 228 is included for deploying the high-lift assembly 223 from the storage compartment 221 to a deployed position, and for moving high-lift assembly 223 from the deployed position to a stowed position within storage compartment 221. In the illustrated example, high-lift propeller 116 is positioned in front of the aircraft lifting surface and the leading-edge assembly extends entirely behind the high-lift propeller 116.

In various embodiments, a slat assembly may be provided that includes a slat door 234 and a slat nose 235. The slat assembly may also include a rigid or flexible connector or hinge 236 disposed between and connecting slat door 234 and slat nose 235. A leading edge slat door 234 is included in the example of FIG. 2 and may perform a dual function: to control/direct airflow around the leading edge of wing 210 thereby allowing the wing to operate at higher angle of attack without stalling, and to provide a cover or door over storage compartment 221 when the high-lift assembly 223 is stowed. A slat nose 235 is included in the example of FIG. 2 and may provide a leading edge upon deployment.

Additionally, embodiments may be implemented in which the leading edge flap or slat in combination with the high-lift propellers reduces nose-down pitching moment. High-lift devices in general and blowing in particular tend to create large nose-down pitching moments by introducing a substantial increase in the moment or torque acting counterclockwise in the wing section (based on the orientation in FIG. 2). Accordingly, the horizontal tail (or canard) is required to create more lift to balance this increased pitching moment. However, when the aircraft is "control power limited" the tail cannot create enough lift to raise the nose and increase the angle of attack further, even if the wing itself is capable of creating more lift. Because embodiments may be implemented in which the leading edge flap or slat creates a lift force at the front of the wing, this reduces the nose-down pitching moment. Particularly, the leading edge flap or slat can be configured to create a leading edge up moment (clockwise in FIG. 2) that counteracts the trailing edge flap lift. This reduction in pitching moment may be especially useful for a derivative or modification of an existing aircraft design (e.g., as shown in FIG. 1). The slat angle and other parameters (shown in FIG. 5, below) can be adjusted in various embodiments to mitigate the pitching moment at high lift versus maximizing wing lift, depending on which is better for a particular design.

In this and other examples illustrated herein, high-lift assembly 223, as described, includes propeller 222 and its associated drive motor 224. This example illustrates a one-to-one correspondence between a motor 224 and propeller 222. In various embodiments, motor 224 is not connected directly to propeller 222 as illustrated in these examples. Instead, motor 224 may be connected to propeller 222 using a driveshaft or other linkage and may further be connected via a gearbox such as, for example, a spur planetary gearbox, a bevel planetary gearbox, a spur and pinion gearbox, crown and pinion gearbox or other gearbox. Additionally, a differential gearbox can be provided such that the motor and propeller can rotate about a different axis of rotation. Further, a single motor 224 may be used to drive multiple propellers 222.

Accordingly, instead of including a propeller 222 and a motor 224 as illustrated in the example of FIG. 2 (and other examples illustrated herein), high-lift assembly 223 in various embodiments may include a propeller 222 and a propeller mounting mechanism (e.g., in place of motor 224 in the Figures) to mount propeller 222 to the slat assembly (e.g., to slat nose 235), fixedly or pivotably. The mounting mechanism may include a gearbox such as for propeller reduction gearing and differential gearing.

The example of FIG. 2 also includes an auxiliary split flap 233 deployed from Fowler flap 232. This may be configured as an essentially flat plate formed by the aft lower surface of Fowler flap 232, and may be hinged at its leading edge for deployment. The purpose of split flap 233 is to add additional lift while also adding substantial drag, which is important for landing to counteract some or all of the thrusts that might be added by high-lift assembly 223. The auxiliary split flap 233, which can be deflected up to 90°, would also increase the downward deflection of the propeller slipstream, increasing the lift due to the high lift propellers. Finally, it reduces the angle of attack for approach, which improves visibility over the nose on landing.

Figure 3:
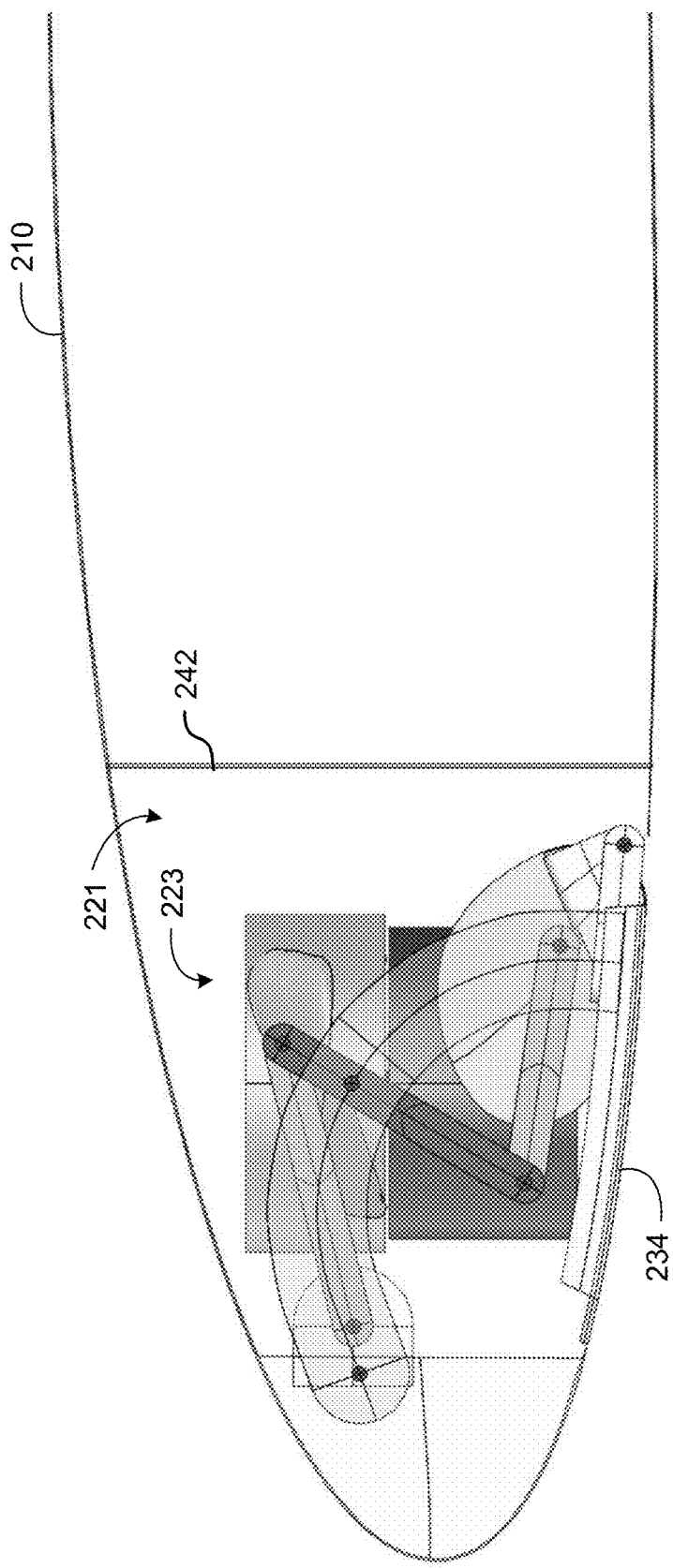
FIG. 3 illustrates an example of a high-lift assembly stowed in a compartment of the forward section of the wing in accordance with various embodiments.

FIG. 3 illustrates an example of a high-lift assembly stowed in a compartment of the forward section of the wing in accordance with various embodiments. This example illustrates the high-lift assembly 223 in the example of FIG. 2 in its stowed position within storage compartment 221 of wing 210. As seen in this example, the leading edge slat 234 is now positioned on the bottom surface of the leading edge of wing 210 to provide a door or compartment cover that effectively covers all or part of the opening of storage compartment 221 through which high-lift assembly 223 is deployed. As seen in this example, leading edge slat 234 can be shaped to provide a substantially continuous surface (continuous to within available manufacturing tolerances for the aircraft) for the lower surface of the leading edge of wing 210. In some embodiments, leading edge slat 234 can completely close storage compartment 221, whereas in other embodiments leading edge slat 234 may be configured to only partially cover the compartment opening. As this example illustrates, deployment mechanism 228 can be configured to retract high-lift assembly 223 back into storage compartment 221. Although not illustrated in FIG. 3, a motor or other suitable drive mechanism, which may be actuated via cockpit control, may be included to operate deployment mechanism 228 for deployment and retraction of high-lift assembly 223.

Embodiments may be implemented in which the high-lift propellers are implemented as variable pitch, or controllable pitch propellers. In such implementations, embodiments may be implemented to use this pitch variation capability to reposition the propeller blades between the stowed and extended position. While a variable pitch propeller may include a range of adjustment, embodiments may implement a stowed pitch position. For example, feathering the propeller (i.e. twisting the propeller approximately 90 deg (relative to FIG. 2) so the blades are essentially parallel to the wing) may be used to reduce drag and prevent the propeller from spinning (windmilling) if the motor driving it fails. Embodiments may be implemented to feather the propeller when stowed, which would serve a dual purpose of preventing windmilling and could also be used to make the propeller fit in the wing more easily depending on the configuration of the stowage compartment.

Figure 4:
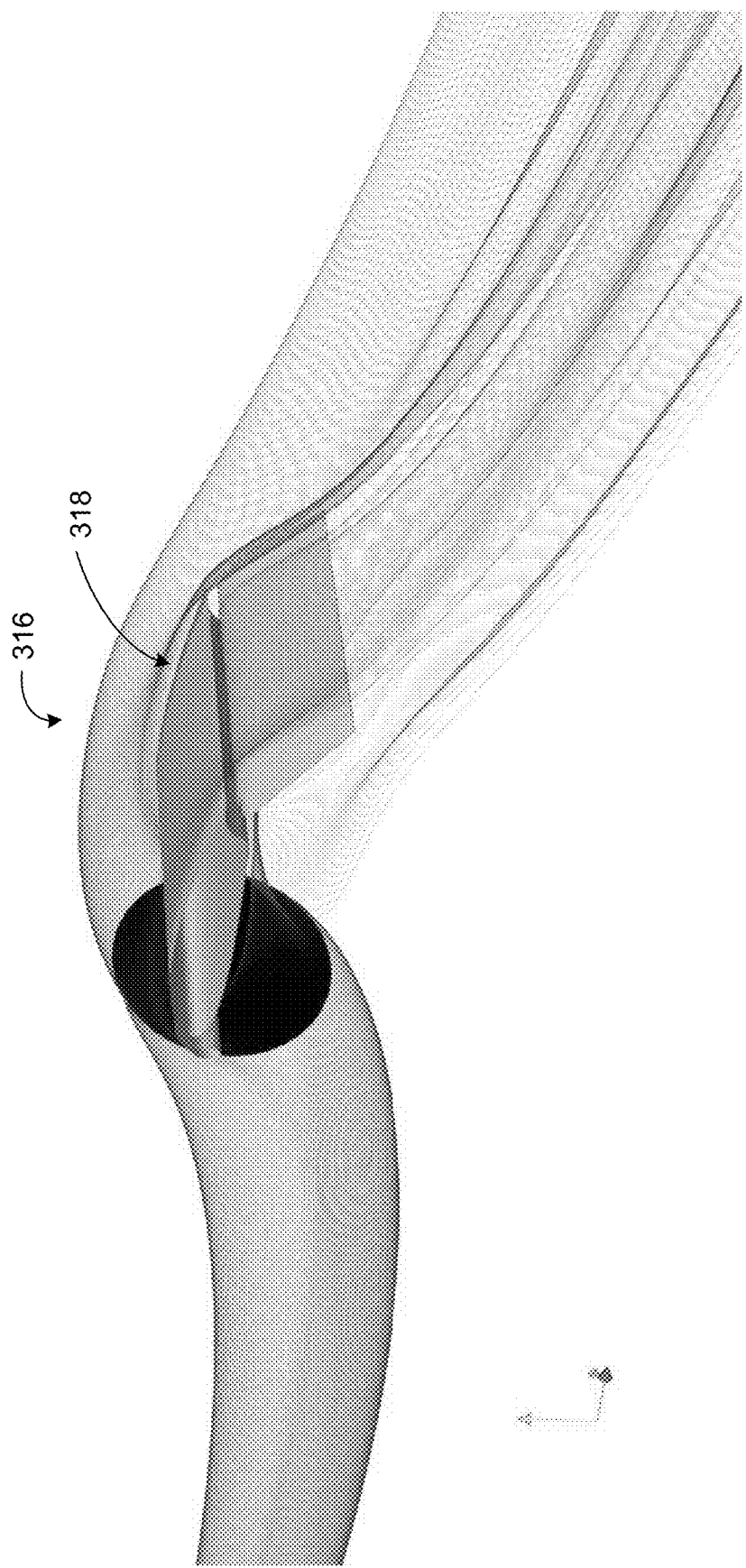
FIG. 4 illustrates a visualization of aerodynamic simulations using Computational Fluid Dynamics (CFD).

FIG. 4 illustrates a visualization of simulations using Computational Fluid Dynamics (CFD). This simulation is for a single bay of the example configuration illustrated and described with reference to FIGS. 2 and 3 with the Fowler flap deployed for landing, but without the auxiliary split flap shown in FIG. 2. The model shows a "stream tube" 316 that traces the path of air that passes through the circle swept by the propeller tip upstream and downstream. This shows that the circulation, or lift, of the wing 318 (e.g., wing 210) with high-lift assembly 223 operating turns the air upward ('up-wash') prior to reaching the propeller and between the propeller and the wing.

This upwash/turning effect indicates that the optimum propeller location varies with design conditions such as the trailing edge wing flap deflection and that changes in the wing lift can affect the propeller slipstream such that it is no longer in the optimum position relative to the wing to enhance lift. The position of the slat immediately behind the propeller helps guide the slipstream to control this phenomenon, compared to a wing alone without a slat. Additionally the ability to schedule the slat and prop/motor position with trailing edge flap position (for example, one position for takeoff and a different one for landing) is also possible using various embodiments of the disclosed technology to accommodate this effect and place the propeller optimally for disparate design points.

Figure 5:
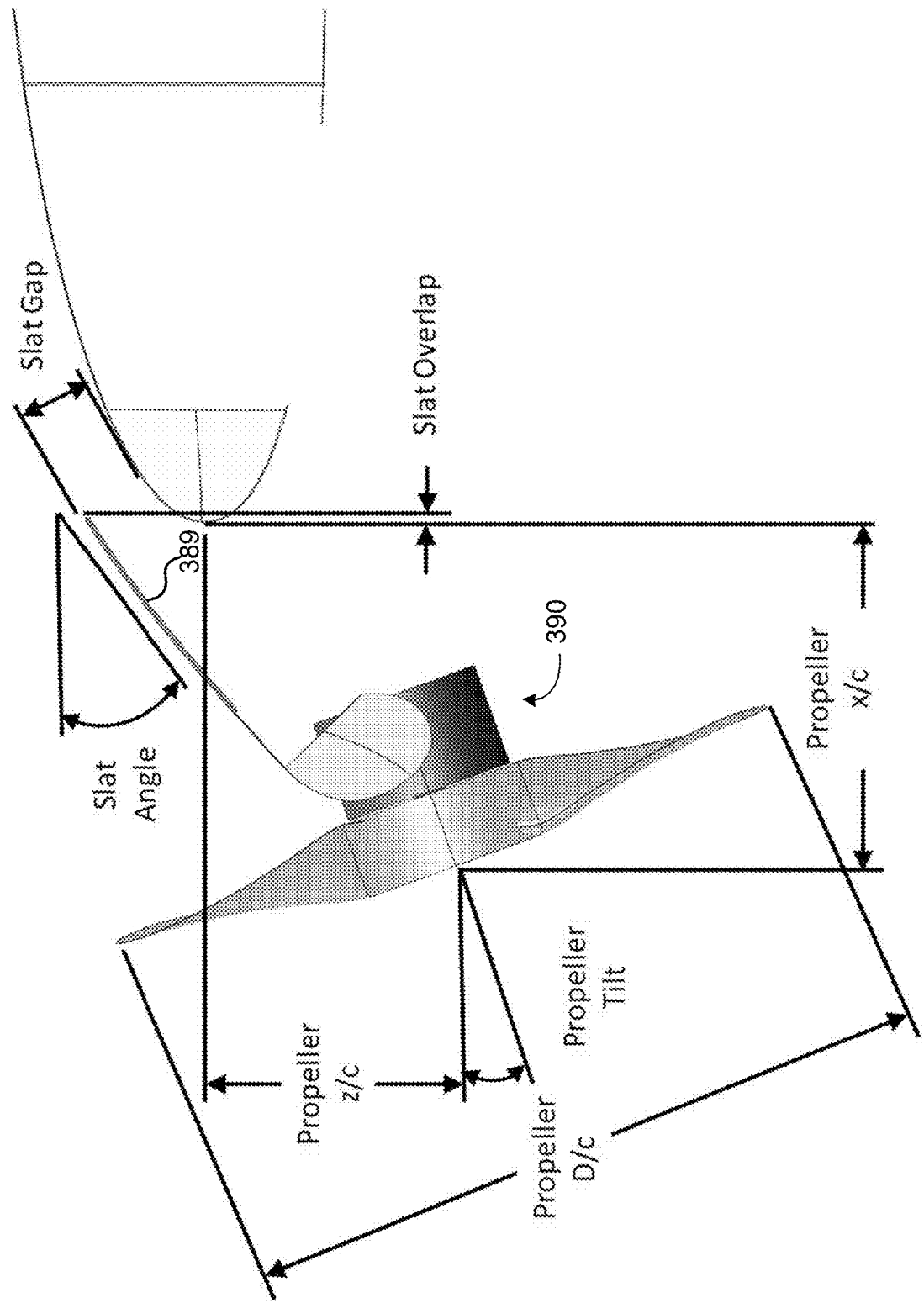
FIG. 5 illustrates the parameters that are important for the effectiveness of lift augmentation using the slat and high-lift assembly configurations in accordance with various embodiments.

FIG. 5 illustrates the parameters that are important for the effectiveness of lift augmentation using the slat and high-lift assembly configurations in accordance with various embodiments. These parameters are not necessarily specific to the slat and high-lift assembly configurations of FIGS. 2 and 3, but can also be applied to other slat and high-lift assembly configurations.

This example illustrates that by choosing a suitable kinematic arrangement of pivot points these important parameters may be optimized for a particular wing geometry and flight condition. The optimum parameters typically depend on both the flight condition and the deployment of other high lift devices (typically trailing edge flaps). In conventional configurations, propellers to augment lift may be attached in a single fixed position and orientation that is chosen as a compromise for takeoff, cruise and landing (or other design flight conditions if applicable). This is not true for various embodiments of the systems and methods disclosed herein. Particularly, in some embodiments the pivot mechanism can be designed to place the motor/propeller assembly 390 (e.g., high-lift assembly 223) and slat 389 (e.g., slat 234) in multiple positions, which can then be independently optimized for a given phase of flight including movement of the motor/propeller assembly 390 independently or in combination with the slat 389. Although shown with a positive slat gap, embodiments may be implemented with no slat gap such that the upper surface of the wing and the slat are effectively continuous.

Figure 6:
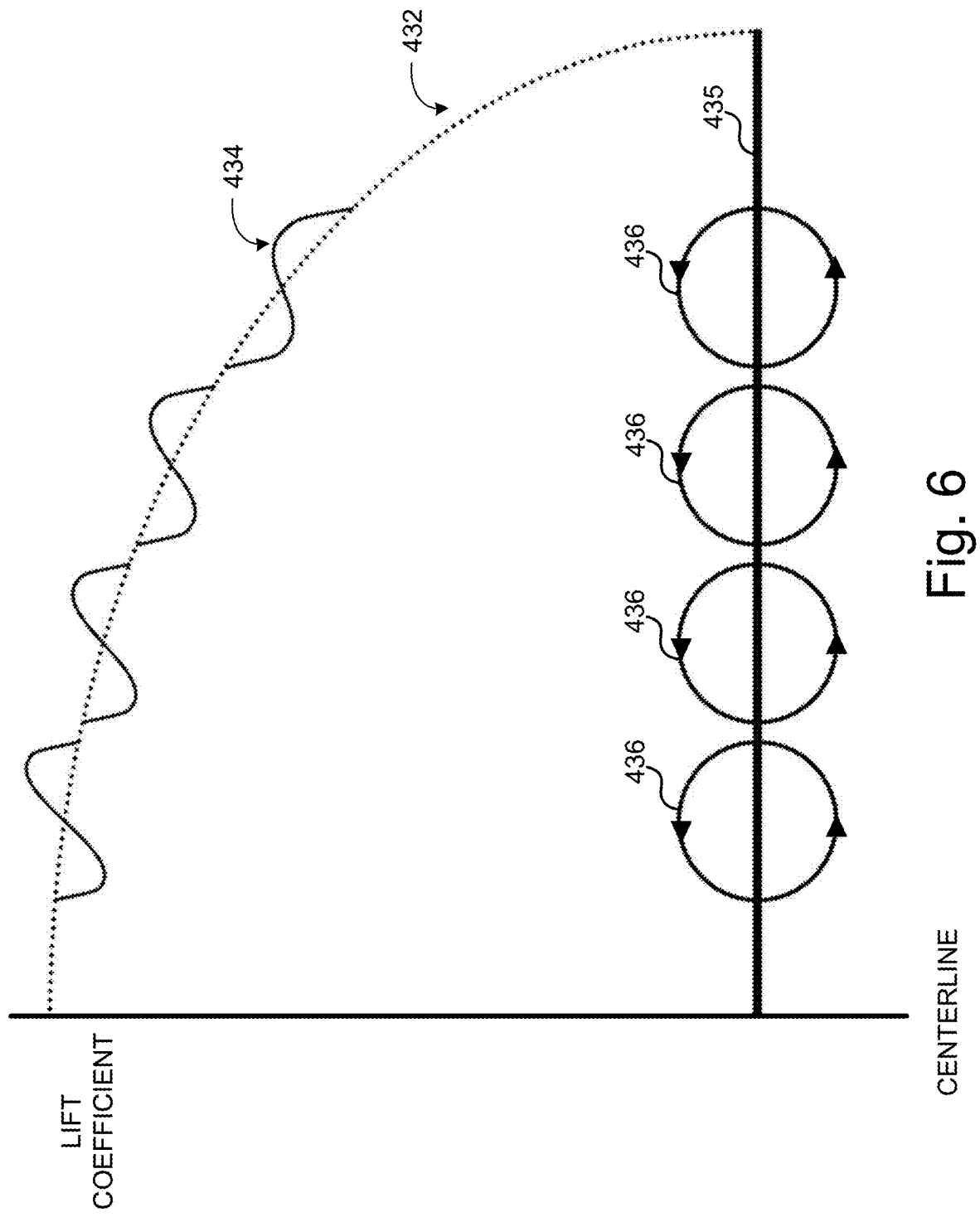
FIG. 6 illustrates the effect of the propeller swirl on the aircraft lift distribution in accordance with various embodiments.

FIG. 6 illustrates the effect of the propeller swirl on the aircraft lift distribution in accordance with various embodiments. This example illustrates a wing 435 (e.g., wing 118) with 4 high-lift propellers 436 (e.g., high-lift propellers 116). The purpose of a propeller is to accelerate the air passing through it, but the rotation of the propeller unavoidably causes some rotation of the air, called swirl. For the wing, this rotation appears as an increase in local angle of attack behind the up-going blade and a decrease behind the down-going blade. This swirl impact on wing lift is shown in the example of FIG. 6, with the arrowheads on the propellers 436 indicating that propellers 436 are rotating counter-clockwise (outboard-up). Curve 432 illustrates the lift without propeller swirl from propellers 436 and curve 434 shows the lift of wing 435 with swirl from propellers 436. This swirl effect is generally undesirable and can cause loss of propeller and wing efficiency as well as an earlier aerodynamic wing stall due to the increase in angle of attack behind the upgoing blade.

Figure 7:
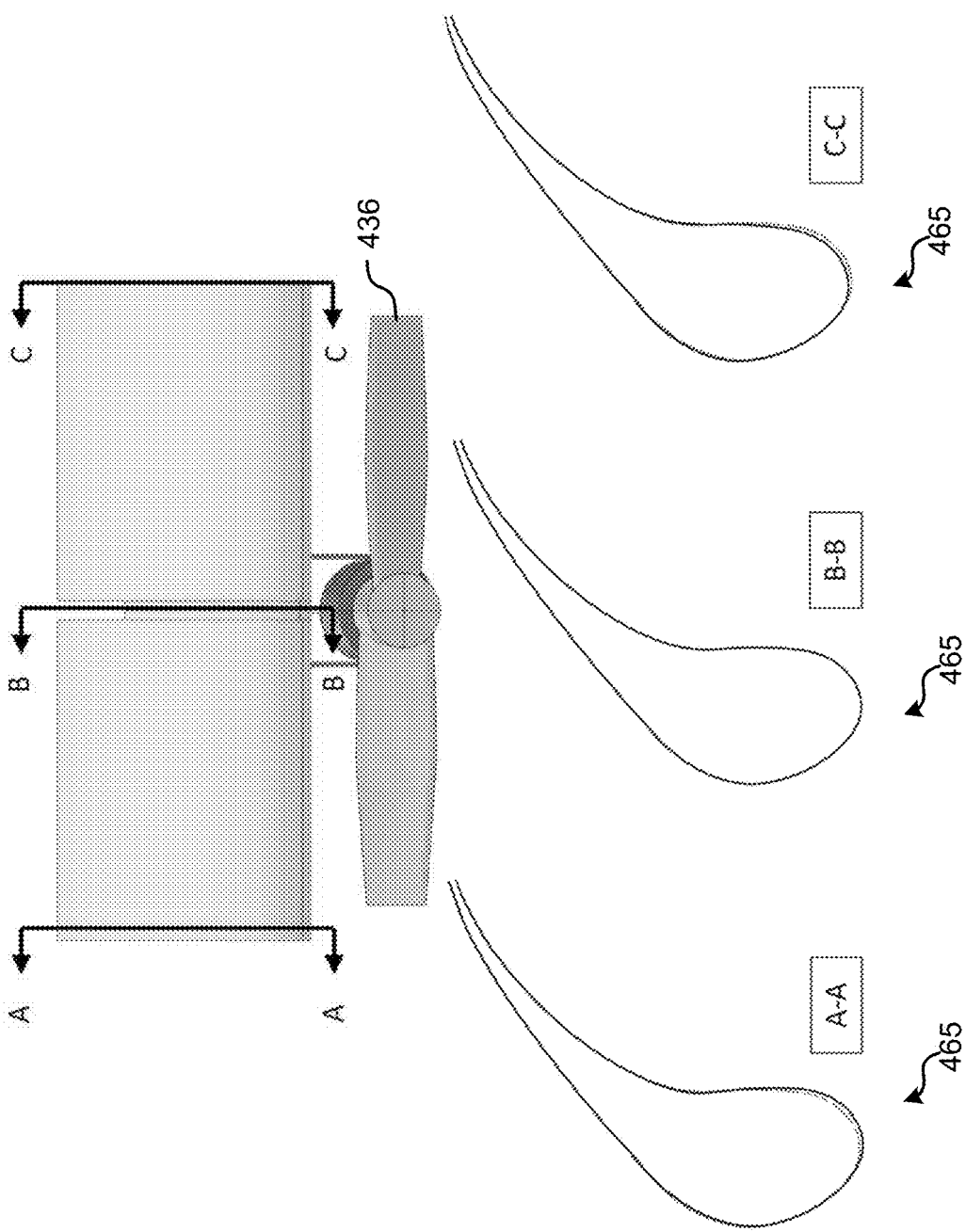
FIG. 7 illustrates an example of a forward slat twisting along the span to compensate for the effects of swirl in accordance with various embodiments.

In various embodiments, a forward slat may be twisted geometrically or aerodynamically along the span to achieve an optimum shape to work in the flow field behind the high-lift propeller, including taking into account the effects of swirl. FIG. 7 illustrates an example of forward slat twisting along the span to compensate for the effects of swirl in accordance with various embodiments. In this example the right blade of high-lift propeller 436 is upgoing. The cross sections A-A, B-B and C-C, show an exemplary airfoil section in a solid line. In various embodiments, the slat shape may be optimized to work in the flow field behind the high lift propellers 436, including swirl, without affecting the cruise wing geometry by leaving the upper aft surface of the slat (forming the wing's lower surface when stowed) unchanged while adjusting the shape of the slat nose, which is interior to the wing when the high lift system is stowed for cruise.

The lift of a wing is proportional to the angle of attack, which is the angle between the wing chordline and the relative wind hitting the wing. The effect of swirl caused by the propeller is to increase the angle of attack and thus the lift at section C-C and decrease the angle of attack at section A-A. Accordingly, to compensate for the change in the incoming air, the wing can be twisted. For example, for each 1° increase in angle of attack at C-C and 1° decrease in angle of attack at A-A, embodiments may be implemented to twist the wing section 1° up at A-A and 1° down at C-C to result in a smoothly varying lift across the wing. An alternative is to alter the shape of the slat to compensate for swirl to flatten curve 434 back to the smooth distribution as shown at curve 432. Therefore, rather than twisting the same wing section, embodiments may alter the shape of the wing to achieve a similar effect to twisting the wing. Accordingly, in this example, the shapes at sections A-A and C-C are altered to offset the swirl of the propeller.

Embodiments may be implemented such that the alteration is to the shape of slat nose 465, which is stowed inside the wing for cruise. Therefore, alterations to slat nose 465 across the wing would tend to not interfere with lift during cruise. The slat illustrated in this example is a single piece, but the same method is applicable to a folding nose option as well, examples of which are described below.

FIG. 8-12 illustrate a folding nose configuration for a high-lift assembly in accordance with various embodiments. The folding nose configuration can provide design freedom to position the slat and motor in the ideal aerodynamic location, and in various embodiments may be completely contained within the cruise wing (including with no external brackets).

In this example, the propeller is an open propeller and the motor and propeller are rigidly attached to the slat folding nose, which may be implemented as a slat assembly that may include a slat nose 522 and a slat door 521. The slat assembly may further include a rigid or flexible hinge connecting slat nose 522 and slat door 521. For example, slat nose 522 and slat door 521 may be connected by a thin, flexible piece of material in the form of a flexible skin 525, which can fold and unfold as the slat nose pivots relative to the door. Flexible skin 525 can be configured to keep a smooth surface in the area where it is aerodynamically important to do so. An example of a flexible skin 525 is described with reference to FIGS. 10-12.

The folding action of the slat nose is driven by a linkage, or deployment mechanism 517, attached to the wing at some point offset from the slat door hinge. The relative position of these two pivots affects the schedule of nose rotation, i.e., the amount that slat nose 522 unfolds for a given slat door 521 rotation. The particular hinge arrangement shown biases the nose unfolding until the slat door is further open, which is necessary to allow the nose and motor to clear the opening in the lower surface of the wing.

Figure 8:
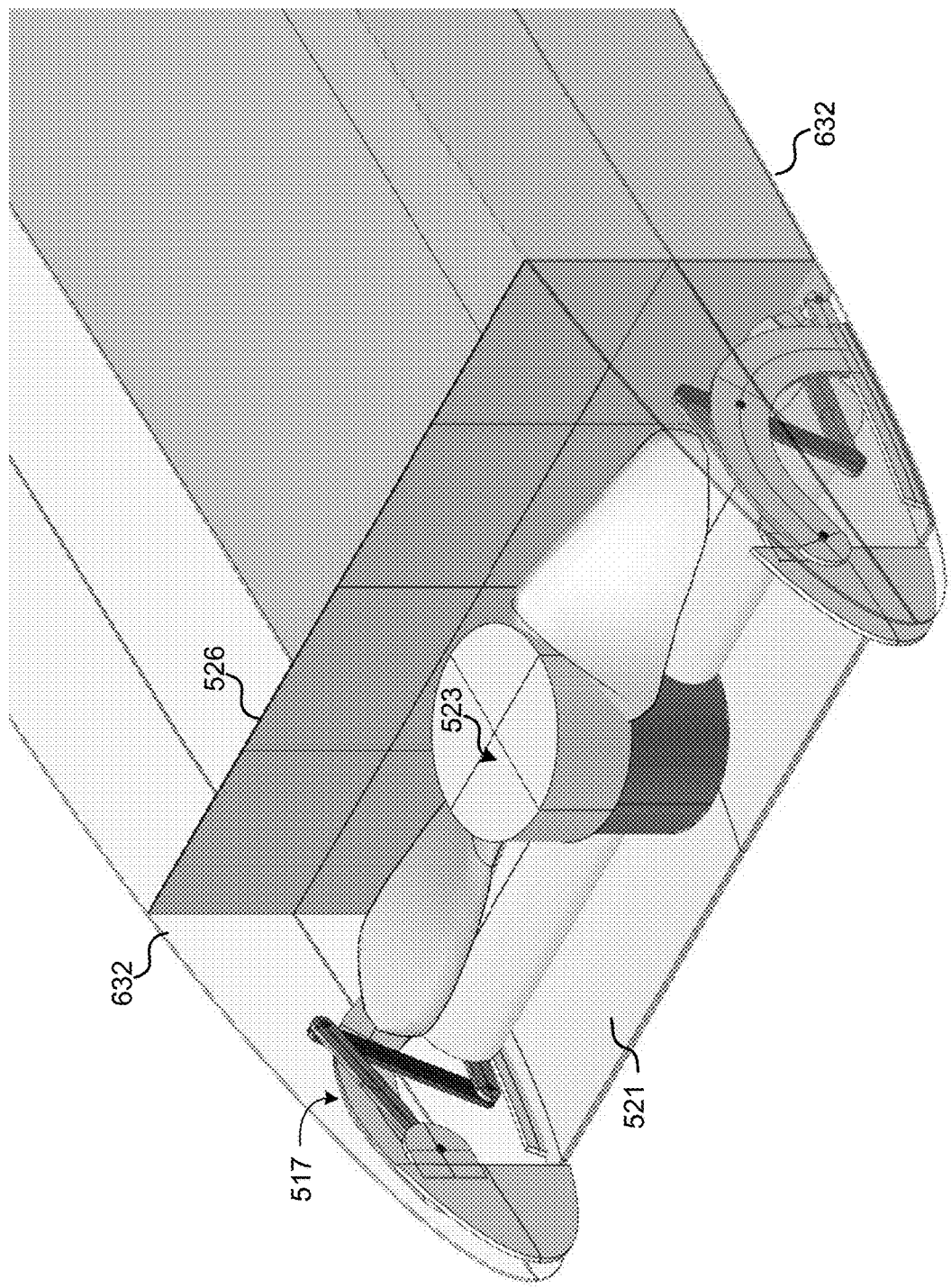
FIG. 8 illustrates an isometric view of a folding nose configuration with the high-lift assembly in a stowed configuration.

FIG. 8 illustrates an isometric view of a folding nose configuration with the high-lift assembly in a stowed configuration. In this example, high-lift assembly 523 and deployment mechanism 517 (e.g., deployment mechanism 228) can be configured to be stowed entirely within the boundaries defined by wing ribs 632A, 632B, forward spar 526 and the upper and lower wing skins. In this example, slat door 521 forms the lower surface of the wing, which can be configured to be substantially continuous with the lower wing skin. The upper and leading edge wing skin is removed for clarity, and the wing ribs are shown as transparent.

This example represents a single spanwise bay of the wing, although in various embodiments the slat may be longer and may include multiple motor/propeller assemblies 523. The wing structure is provided by way of example only and is included merely to illustrate typical geometrical constraints in various applications in which the slat door 521, high-lift assembly 523 and deployment mechanism 517 would have to fit. It is noted that for the end wing rib forward of the forward spar 526, which is used to support the pivots for the slat the slat mechanism may be disposed between a full rib (e.g., outboard wing ribs 632B illustrated in FIG. 13) and partial nose rib (e.g., inner wing ribs 632A illustrated in FIG. 13), depending on the wing configuration.

Figure 9:
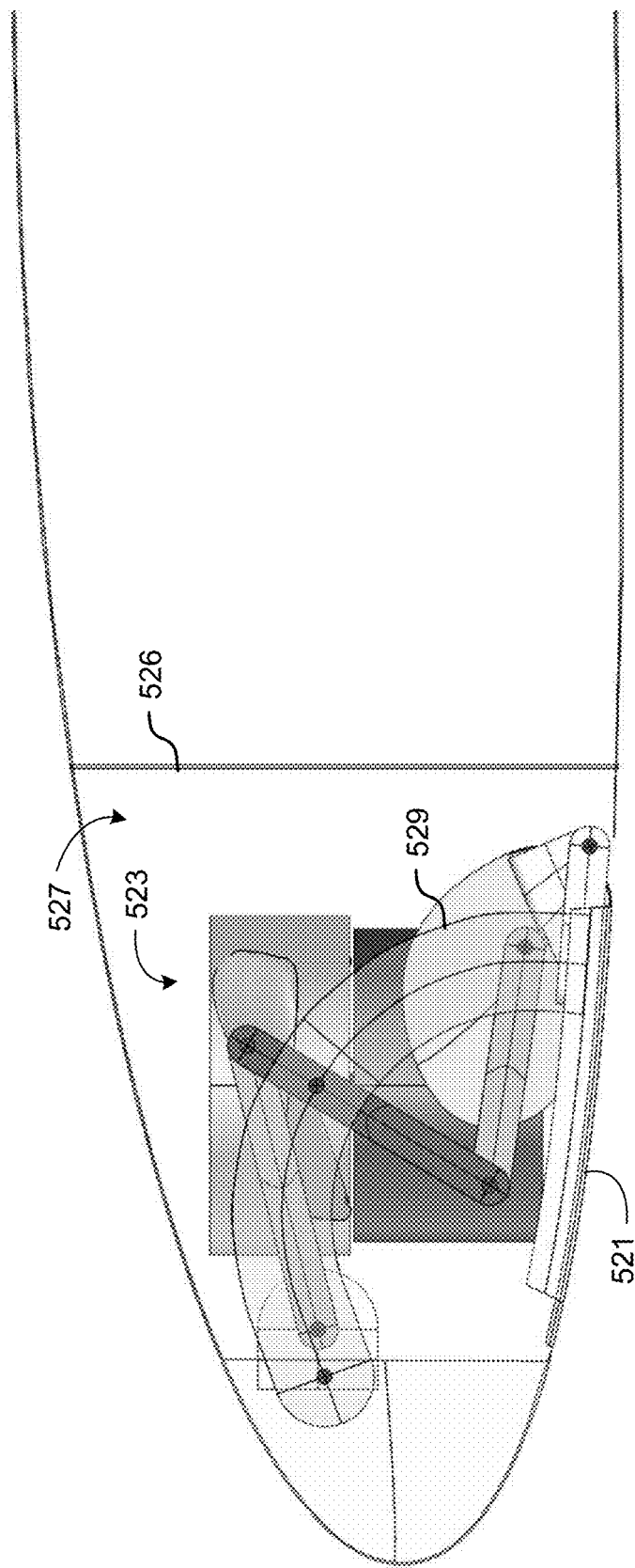
FIG. 9 illustrates a side view of the slat and motor in a stowed configuration in accordance with various embodiments.

FIG. 9 illustrates a side view of the slat and motor in a stowed configuration in accordance with various embodiments. Particularly, FIG. 9 illustrates a side view of the folding nose configuration of FIG. 8 with the slat and motor in a stowed configuration. In this folding door configuration, high-lift assembly 523 and deployment mechanism 517 are stowed entirely within storage compartment 527 and the leading edge of the wing. The motor and propeller assembly 523 in this example are completely contained within the wing, and storage compartment 527 is closed by slat door 521. A larger motor could be accommodated by locally bumping out the slat door to allow the motor to extend some distance outside of the cruise wing profile or wing outer mold line. As illustrated, slat door 521 and this example maintains the profile of the wing outer mold line to minimize drag with the slat and high-lift assembly stowed for cruise.

Figure 10:
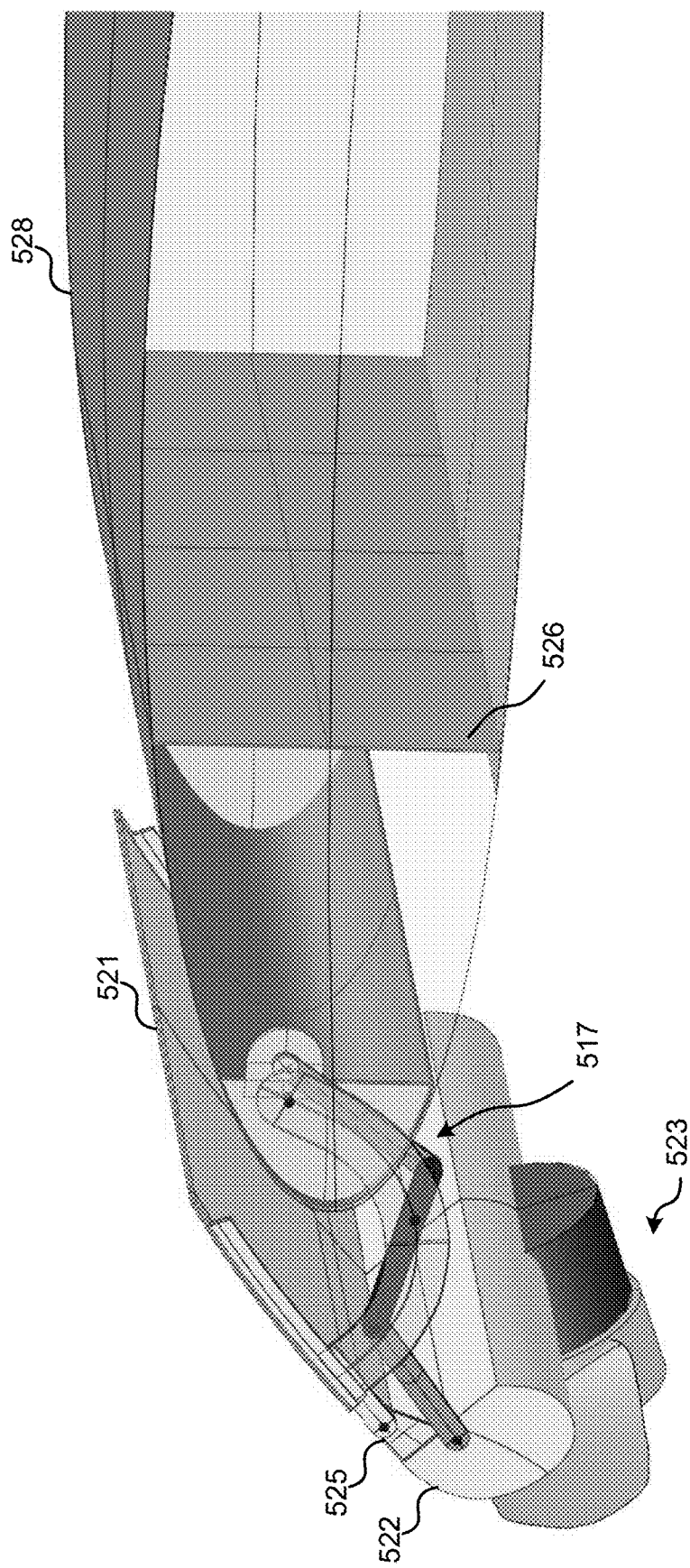
FIG. 10 illustrates an isometric view of the slat and motor in the deployed position in accordance with various embodiments.

FIG. 10 illustrates an isometric view of the slat and motor in the deployed position in accordance with various embodiments. Particularly, FIG. 10 illustrates an isometric view of the folding nose configuration of FIGS. 8 and 9 with the slat and motor in a deployed configuration. In this example, the full wing skin of 528 is shown but the wing ribs 632A, 632B are shown as transparent for clarity. The slat door bracket 529 is also transparent to show the deployment mechanism 517 for the slat nose rotation.

Figure 11:
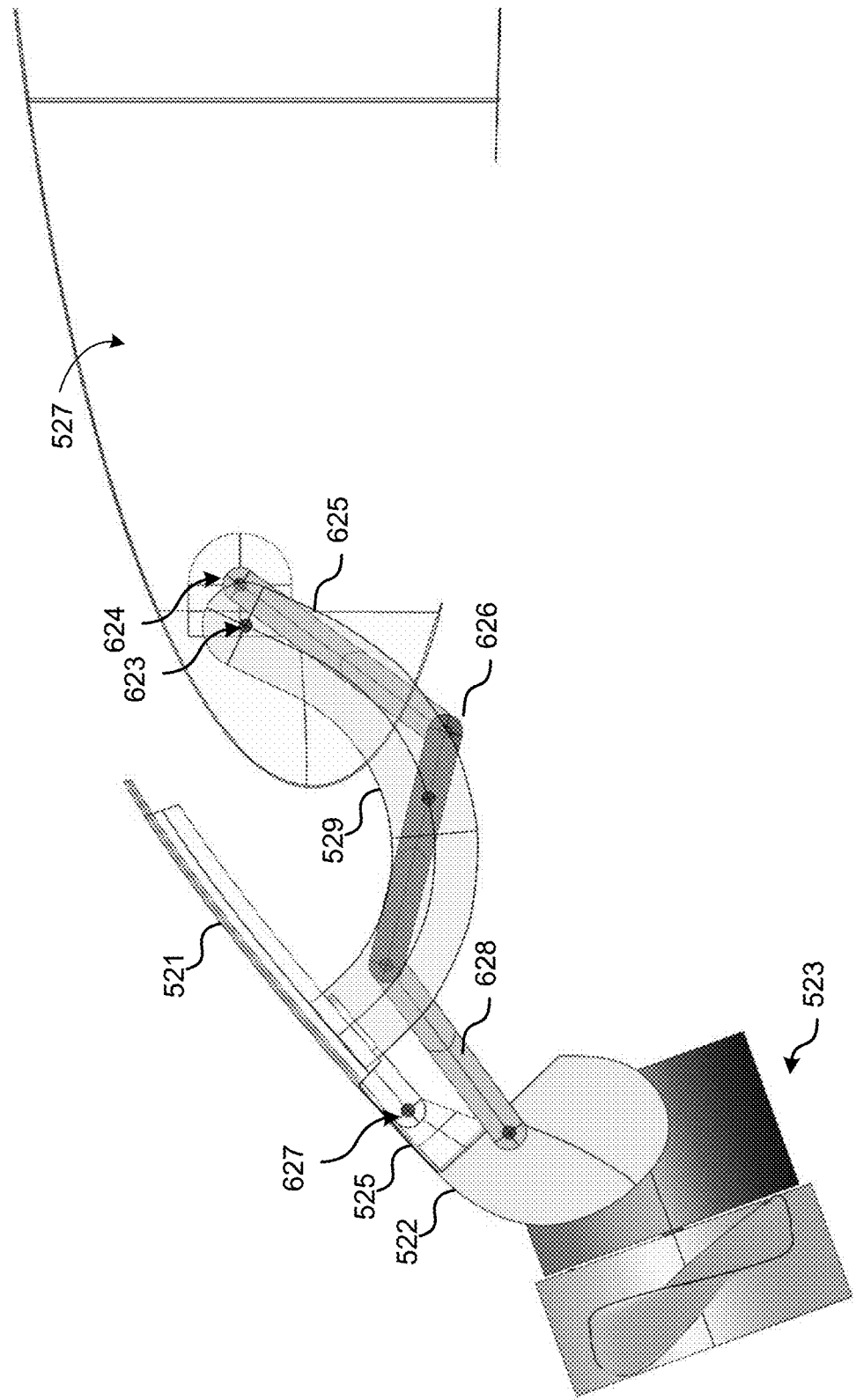
FIG. 11 illustrates a side view of the slat and motor deployed in accordance with various embodiments.
Figure 12:
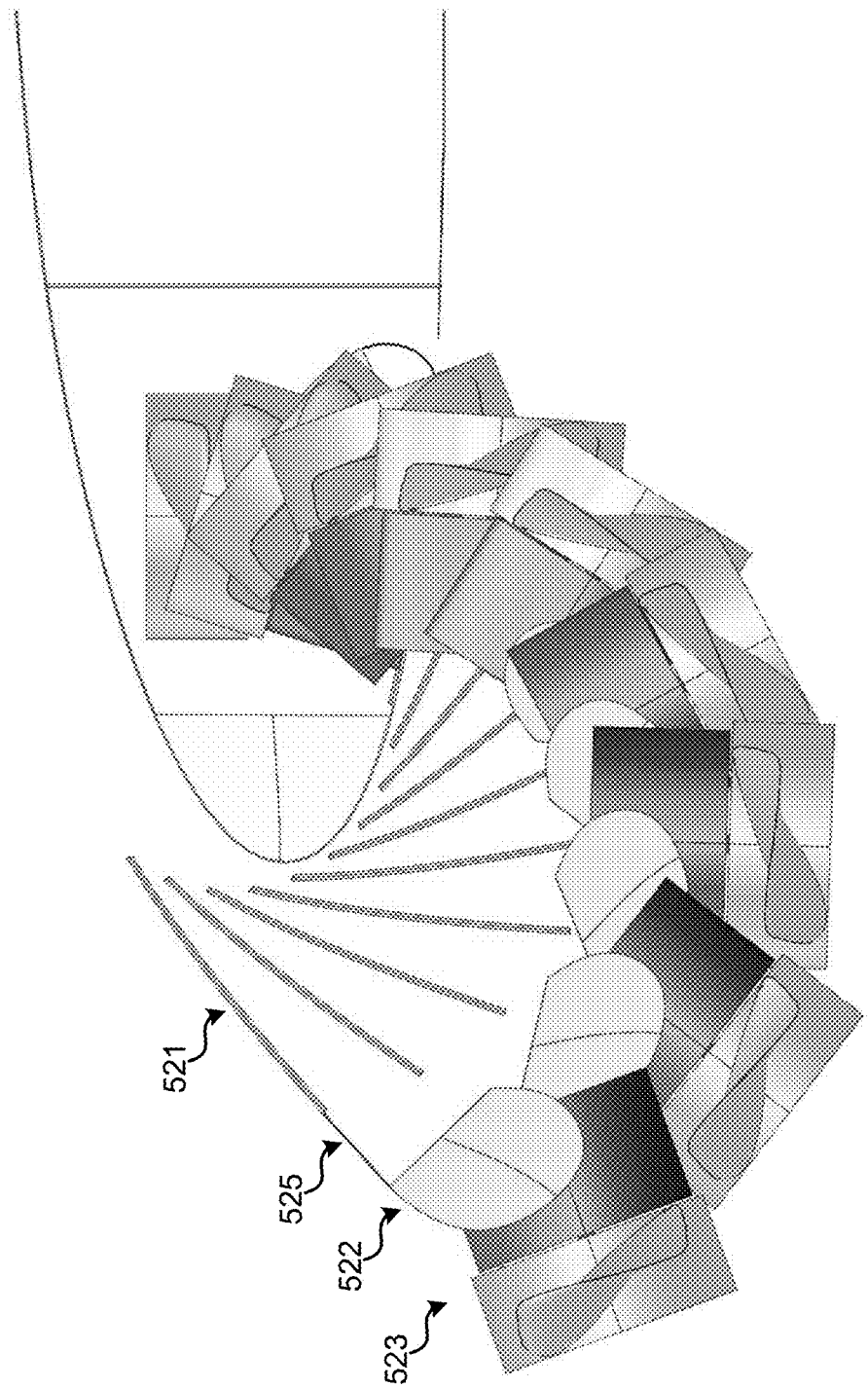
FIG. 12 illustrates an example deployment from the stowed position to the open position in accordance with various embodiments.

FIG. 11 illustrates a side view of the slat and motor deployed in accordance with various embodiments. Particularly, FIG. 11 illustrates a side view of the folding nose configuration of FIG. 10 with the slat and motor in a deployed configuration. FIG. 12 illustrates an example deployment from the stowed position to the open position in accordance with various embodiments. The deployment mechanism 517 is omitted for clarity. In this example, the linkage includes a slat door pivot 623, a drive linkage pivot 624, an upper drive link 625, an idler 626, a lower drive link 628 and slat door bracket 529.

Although not illustrated, a deployment motor or other drive mechanism can be used to apply rotational forces to cause slat door bracket 529 to rotate about slat door pivot 623, thereby controlling deployment and stowage. The slat deployment could be actuated by a linear (extending length) actuator between the forward spar and the slat door bracket (not shown), or by a rotary actuator or torque tube on the slat door pivot (also not shown).

The rotation of slat door 521 around slat door pivot 623 also actuates the nose door folding via the drive linkage pivot 624. An idler 626 is attached to the slat door bracket 529 to reverse and transmit the drive motion caused by the offset hinges. For deployment from the stowed position, rotational forces from the drive motor (not shown) in the clockwise direction (from the frame of reference of FIG. 11) cause slat door bracket 529 to rotate in the clockwise direction moving slat door 521 and slat nose 522 from the stowed position (FIGS. 8 and 9) to the open position (FIGS. 10 and 11). Idler 626, attached to slat door bracket 529, moves with slat door bracket 529, causing upper drive link 625 and lower drive link 628 to likewise pivot in a counterclockwise direction, thereby unfolding this mechanism and deploying high-lift assembly 523. This also causes high-lift assembly 523 mounted to slat nose 522 to pivot in a counterclockwise direction to its final position. For stowage, the operation is reversed. As this illustrates, slat bracket 529 and slat door pivot 623 provide a load path from the motor and slat into the main wing.

The figures show a single deployment angle (i.e., fully deployed). However, in various embodiments there may typically be two (or more) deployment angles chosen to allow deployment to a chosen position/angle to optimize the slat position and motor angle for different phases of flight. For example, embodiments may be implemented in which there is one deployment angle optimized for takeoff and a second deployment angle optimized for landing, and this may be dependent on the mission the aircraft is designed for. Position encoders or other sensor mechanisms can be used to sense the deployment angle and report back to a controller to control deployment.

As noted above, FIG. 12 illustrates a side view showing the deployment in accordance with various embodiments. Particularly, FIG. 12 illustrates deployment the slat door 521, slat nose 522 and the motor/propeller assembly 523 for every 15 degrees of slat door rotation. Linkages and brackets are removed for clarity and the flexible skin 525 connecting the slat nose 522 and slat door 521 is only shown in the fully deployed and stowed position. This figure shows how the schedule of slat nose rotation versus slat door rotation allows the motor and slat nose to fit through the opening in the bottom of the wing as well as staying within the compartment formed by the main wing and the forward spar (i.e., the slat nose, motor & propeller doesn't hit the top of the wing or spar as it deploys). As this illustrates, slat nose 522 and motor/propeller assembly 523 rotate about a hinge connected to slat door 521 such that when fully deployed motor/propeller assembly 523 effectively extends outward (forward) from slat door 521, and when stowed, motor/propeller assembly is no longer extended, but is instead positioned (curled up) above slat door 521 within the compartment. The deployment schedule is controlled by the geometry of the mechanical linkage and can be varied by pivot locations, arm lengths, and other physical parameters.

Figure 13:
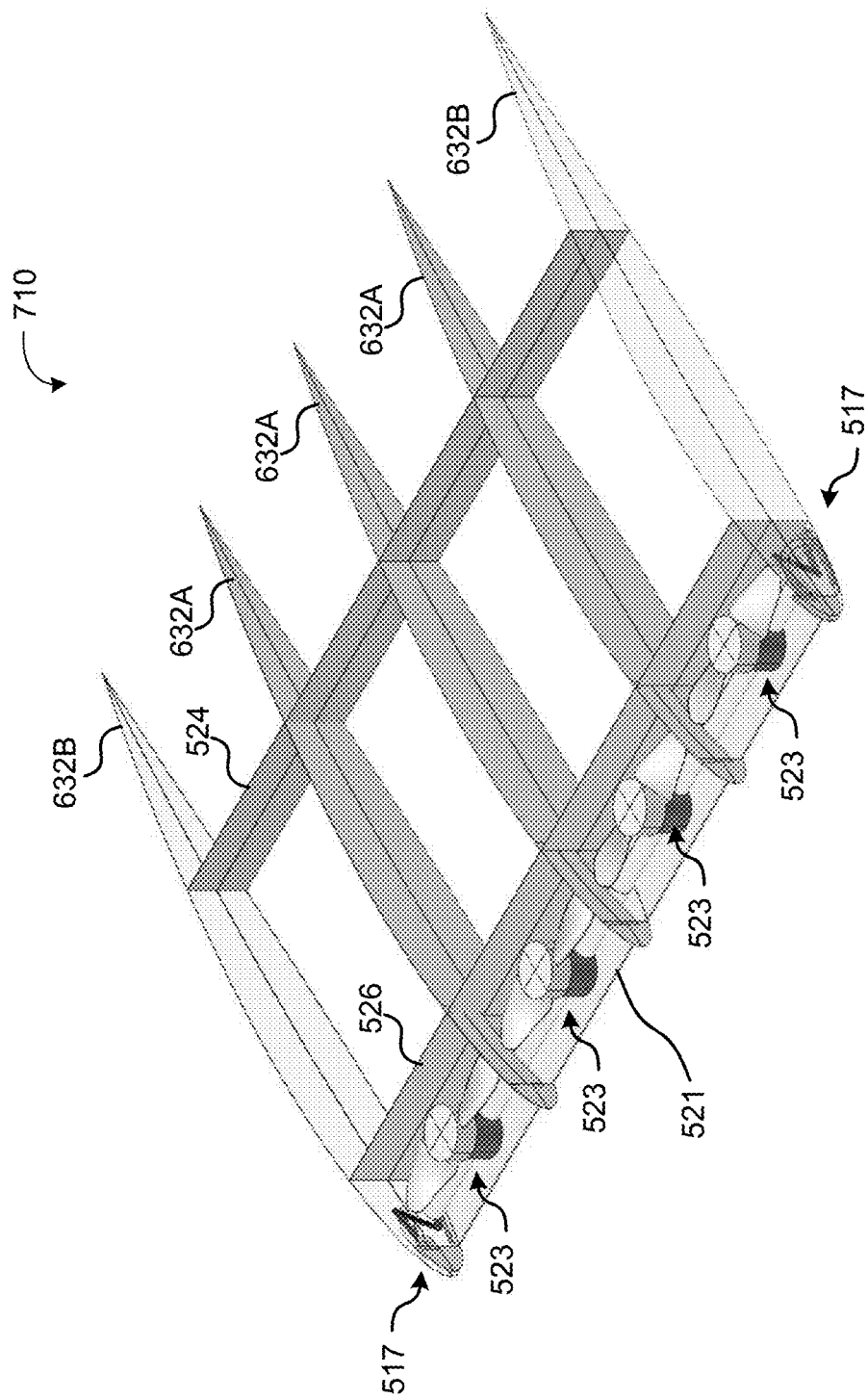
FIG. 13 illustrates an example configuration in which multiple high-lift motor/propeller assemblies are included for a given wing section in accordance with various embodiments.
Figure 14:
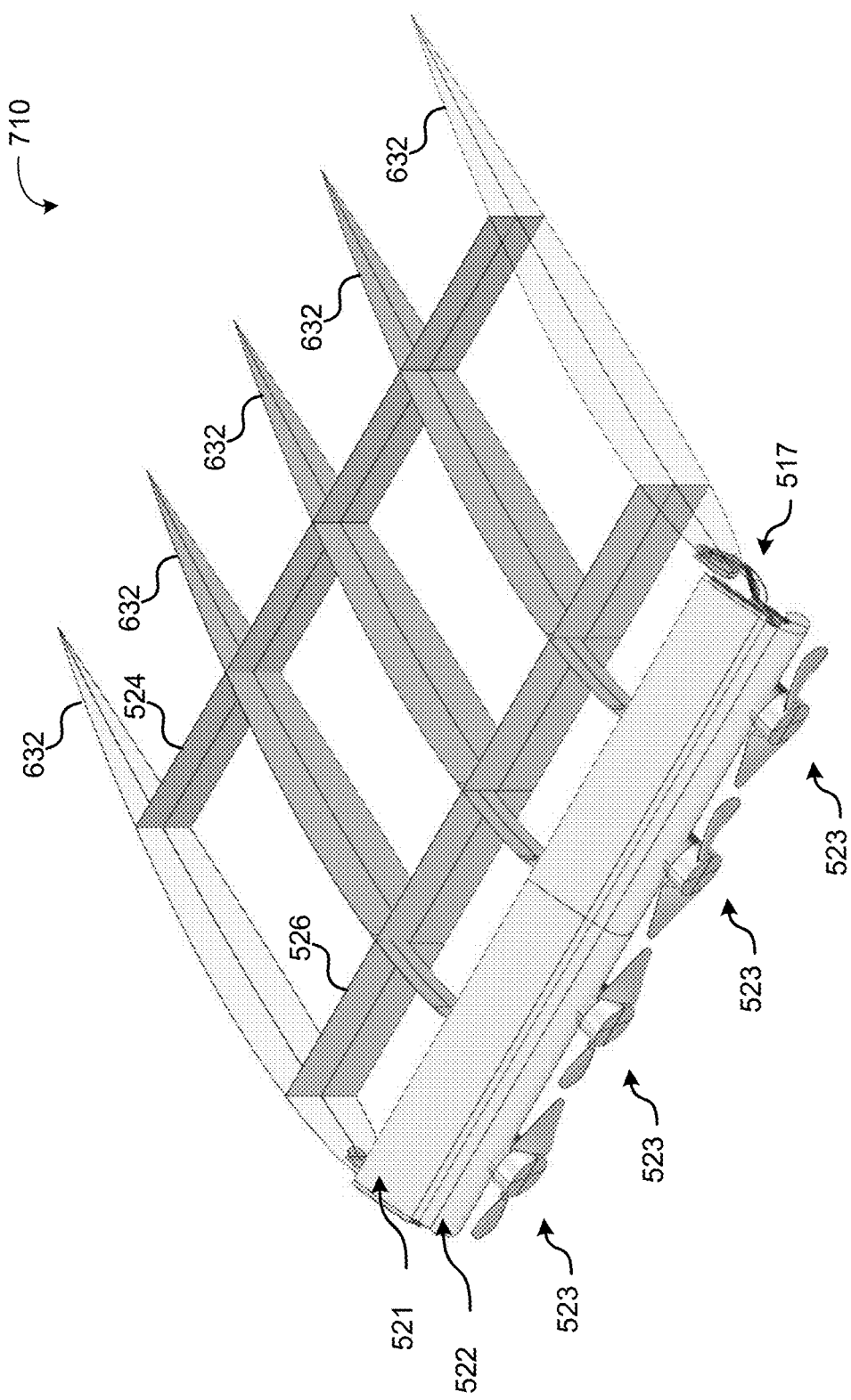
FIG. 14 illustrates another view of the example configuration in which multiple high-lift motor/propeller assemblies are included for a given wing section in accordance with various embodiments.

FIG. 13 illustrates an example configuration in which multiple high-lift motor/propeller assemblies are included for a given wing section in accordance with various embodiments. FIG. 14 illustrates another view of the example configuration in which multiple high-lift motor/propeller assemblies are included for a given wing section in accordance with various embodiments. Particularly, FIG. 14 illustrates a view of the example of FIG. 13 with the slat and high-lift assemblies 523 deployed. The example in FIG. 13 illustrates the four high-lift assemblies 523 for this wing section 710 in a stowed position, while FIG. 14 illustrates the four high-lift assemblies 523 for this wing section 710 deployed, extending forward of and partially below slat door 521 and slat nose 522.

The example in FIGS. 13 and 14 illustrates four high-lift assemblies 523 for the wing section 710, similar to the configuration illustrated in FIG. 1, in which each wing section (i.e., left wing section, right wing section) included four high-lift propellers 116 and their associated motors. The propellers 116 in this example are open propellers. Other details for components that may also be included such as, for example, a trailing edge flap 122, are not illustrated for clarity of illustration.

The example in FIGS. 13 and 14 illustrates key components of a typical wing structure, such as a forward spar 526, aft spar 524, and wing ribs 632A, 632B. This example includes three inner wing ribs 632A (dark grey) and two outer or edge wing ribs 632B (illustrated as transparent). In this example, forward spar 526 and aft spar 524 run the entire width of the wing section 710. There are four compartments defined by the wing ribs sections forward of forward spar 526, each of which in this example is configured to house a high-lift assembly 523. Although four compartments and high-lift assemblies 523 are illustrated in this example, embodiments may be implemented with a greater or lesser quantities of high-lift assemblies 523 and compartments for a given wing section 710 or wing. Also, although this example illustrates one high-lift assembly 523 for each compartment, other embodiments may include multiple high-lift assemblies 523 per compartment, while still further embodiments make be configured such that one or more compartments do not include a high-lift assembly 523.

In this example, a single slat door 521 spans the entire width of the wing section 710 and is controlled by the pair of deployment mechanisms 517 mounted to outer wing ribs 632B. In other embodiments, the configuration may be such that each compartment, or a subset of compartments, has its own slat door 521 and associated drive mechanism(s) 517. The entire span of the slat may form a smooth continuous surface without gaps, for improved aerodynamic performance. This possible because the slat nose 522 may serve as a structural beam serving as a load path from the multiple motors to the bracket and deployment linkage at the slat ends, which provides the load path into the main wing structure. Thus, in various embodiments the slat nose may serve both an aerodynamic purpose and a structural purpose—it may serve as a structural beam to attach the multiple motors to without each motor requiring its own support connected to the wing. The interior of the slat nose can also be used as a conduit to run wiring to the motors.

The end wing ribs 632A ends of the four-motor section may include full height ribs to support the slat pivot mechanism, as shown. Nose ribs (forward of forward spar 526) may be included between each high-lift assembly 523, and may be notched out, or reduced in height in the slat bay area to allow the slat nose to clear when stowed.

With the example configuration, there is a gap at the ends of the slat nose 522, between the slat nose 522 and the end wing ribs 632A (at the end rib) to allow the slat bracket and linkages to move between the stowed and deployed position. Using a configuration having multiple high-lift assemblies 523 for a single slat nose 522 can mean that these gaps are not needed for each assembly. Accordingly, it may be aerodynamically advantageous to attach multiple high-lift assemblies 523 to the slat nose 522 rather than repeating a single motor configuration shown in FIGS. 8 and 10 multiple times end to end across the span.

FIGS. 15-18 illustrate a method to move the motor relative to the slat nose both in translation and rotation in accordance with various embodiments. A purpose of the additional motion may include allowing the propeller position and tilt (e.g., refer to FIG. 5) to be optimized independently of the slat position, which is not possible if they are rigidly connected. Additionally, with the use of a pivot lock (described below) the motor tilt may be varied between two positions for different flight conditions (e.g., such as for takeoff and landing). The illustrations show the motor attached to the same folding nose slat shown in FIGS. 8-14, but the mechanism is not limited to this configuration.

Figure 15:
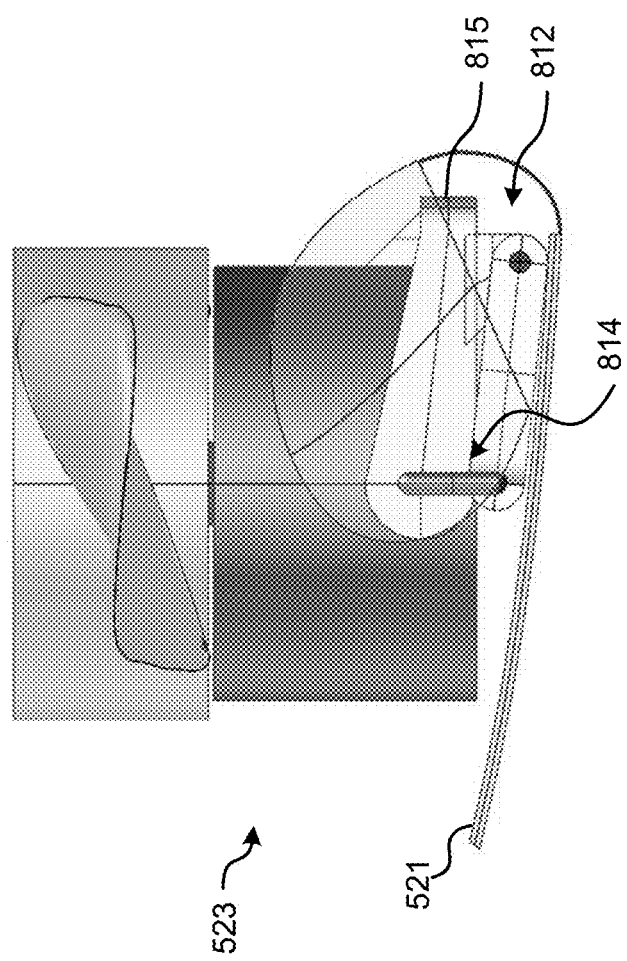
FIG. 15 illustrates a high-lift assembly and a slat door in a stowed configuration in accordance with various embodiments.
Figure 16:
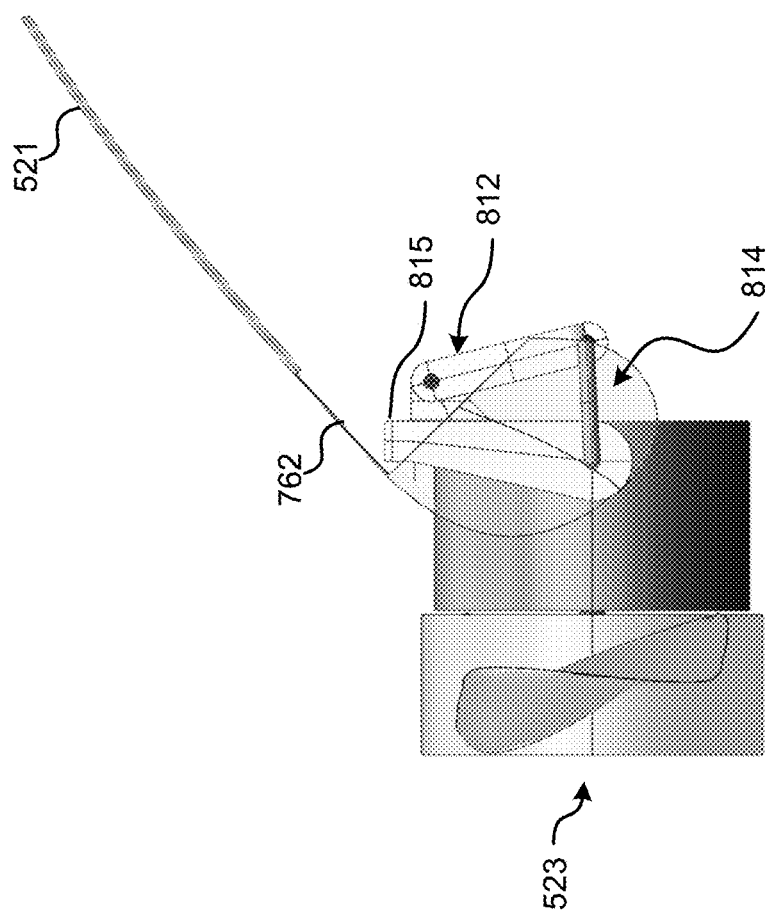
FIG. 16 illustrates a high-lift assembly and a slat door in a deployed configuration in accordance with various embodiments.

FIG. 15 illustrates a high-lift assembly 523 and a slat door 521 in a stowed configuration in accordance with various embodiments. FIG. 16 illustrates a high-lift assembly 523 and a slat door 521 in a deployed configuration in accordance with various embodiments. Slat nose 522 is shown semi-transparently and the surrounding slat extension mechanism shown in earlier figures (e.g., deployment mechanism 517) is removed from the illustration for clarity. In the example of FIGS. 15 and 16, the slat motor mount fitting 812 is fixed to the slat nose 522 and attached by a hinge to the motor mount 815, which is fixed to the motor. The motor mount 815 is additionally attached to the slat by a spring 814, which in this example is shown as being attached to the same fitting as the hinge. In other embodiments, spring 814 need not be attached to the same fitting as the hinge.

When the propeller is producing sufficient thrust to overcome the force of spring 814, the motor mount 815 pivots forward. When the propeller is stopped or windmilling, the thrust is zero, or negative, and spring 814 pulls motor mount 815 back, pivoting the motor down in this case. The figures show the pivot mechanism extended in the slat deployed position and retracted in the slat stowed position, but the retraction would happen when the propeller stopped producing thrust, in the extended position. The same mechanism could be inverted so thrust tips the motor down rather than up.

Mechanical stops may be incorporated into the motor pivot mechanism to limit the range of motion. The spring 814 would typically be sized to give a bang-bang motion between the stops, i.e. the motor pivot is on either the extended stop or on the retracted stop all the time, except for brief transients during motor start up and shutdown. Mechanical force hysteresis, such spring preload or a detent mechanism at the stops, may also be used to provide the bang-bang pivot action.

The pivot action could also be driven by a connection to the nose folding mechanism or by a separate actuator rather than using propeller thrust for the actuation. In various embodiments, the motion of the motor pivot mechanism could also be used to actuate other mechanical devices (motor brake, switches, etc) as described below with reference to FIG. 19.

Figure 19:
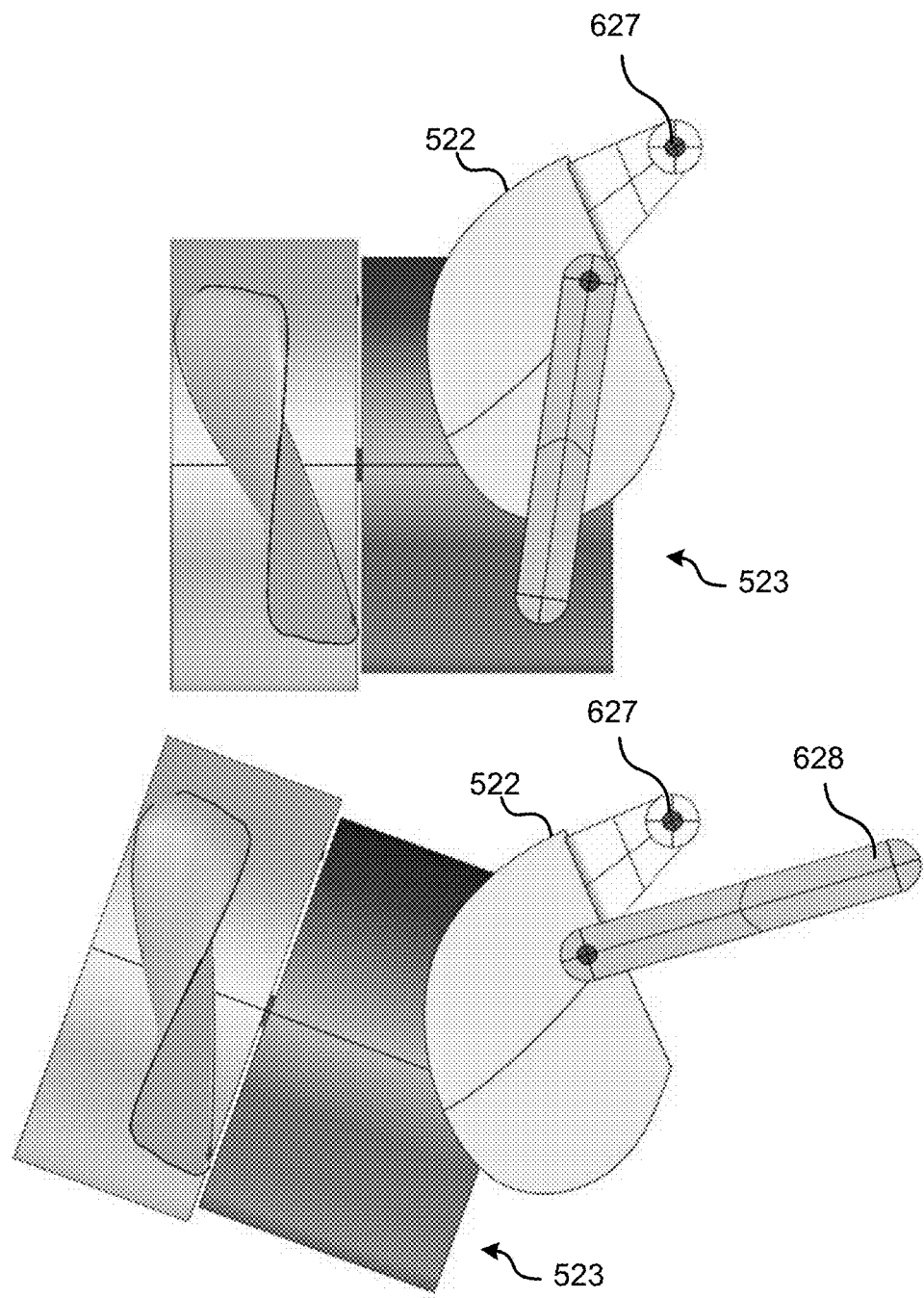
FIG. 19 illustrates a side view detail of a slat nose and motor/propeller in accordance with various embodiments.

Additionally, embodiments may be implemented such that the motor pivot mechanism may be locked mechanically by various methods including an electromechanical lock or a purely mechanical connection to the nose pivot drive link (e.g., as shown in FIG. 19, below). One purpose of a pivot lock may be as a mechanism to vary the motor tilt based on flight condition. For example for landing the motor pivot may be locked in the retracted position at 20 degrees down (the angle shown in FIG. 11) while for takeoff the pivot mechanism is unlocked, allowing the propeller thrust to tilt the motor out to zero degrees (aligned with the wing chord—as shown in FIG. 16). Typically the slat angle used in combination with these two motor positions would also be different, but that is not a limitation of the concept except of course for an arrangement where the lock is activated by the motion of the slat, slat nose, or their driving mechanism.

Figure 17:
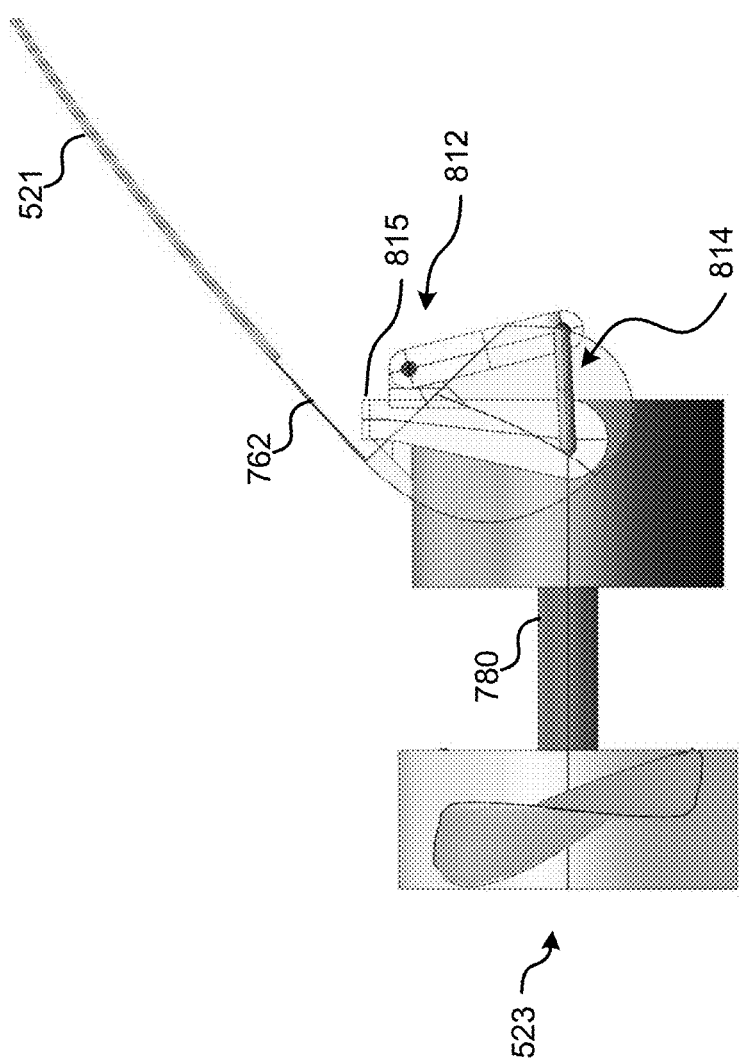
FIG. 17 illustrates an example of propeller translation in accordance with various embodiments.

FIG. 17 illustrates an example of propeller translation in accordance with various embodiments. The example illustrated in FIG. 17 utilizes a telescopic drive shaft 780 to connect the motor and propeller. In the illustrated example, this is shown in combination with the pivot mechanism (i.e., motor mount 815 and spring 814), however the two features are independent embodiments may implement either feature separately or may implement the features together. As with the pivot mechanism, the telescopic drive shaft 780 could be extended by the propeller thrust and retracted by a spring force (not shown) when the propeller is windmilling or stopped. Alternately, it could be moved by an independent actuator such as, for example, a solenoid or other mechanism. Like the pivot mechanism additional mechanical or electromechanical devices could be actuated by the retraction of the telescoping shaft to brake and position the propeller for slat retraction/stow. An alternative arrangement is for a track or slide to be used instead of a telescoping drive shaft, so that the motor shaft is fixed and the entire motor translates away from the slat when the propeller is producing thrust.

Figure 18:
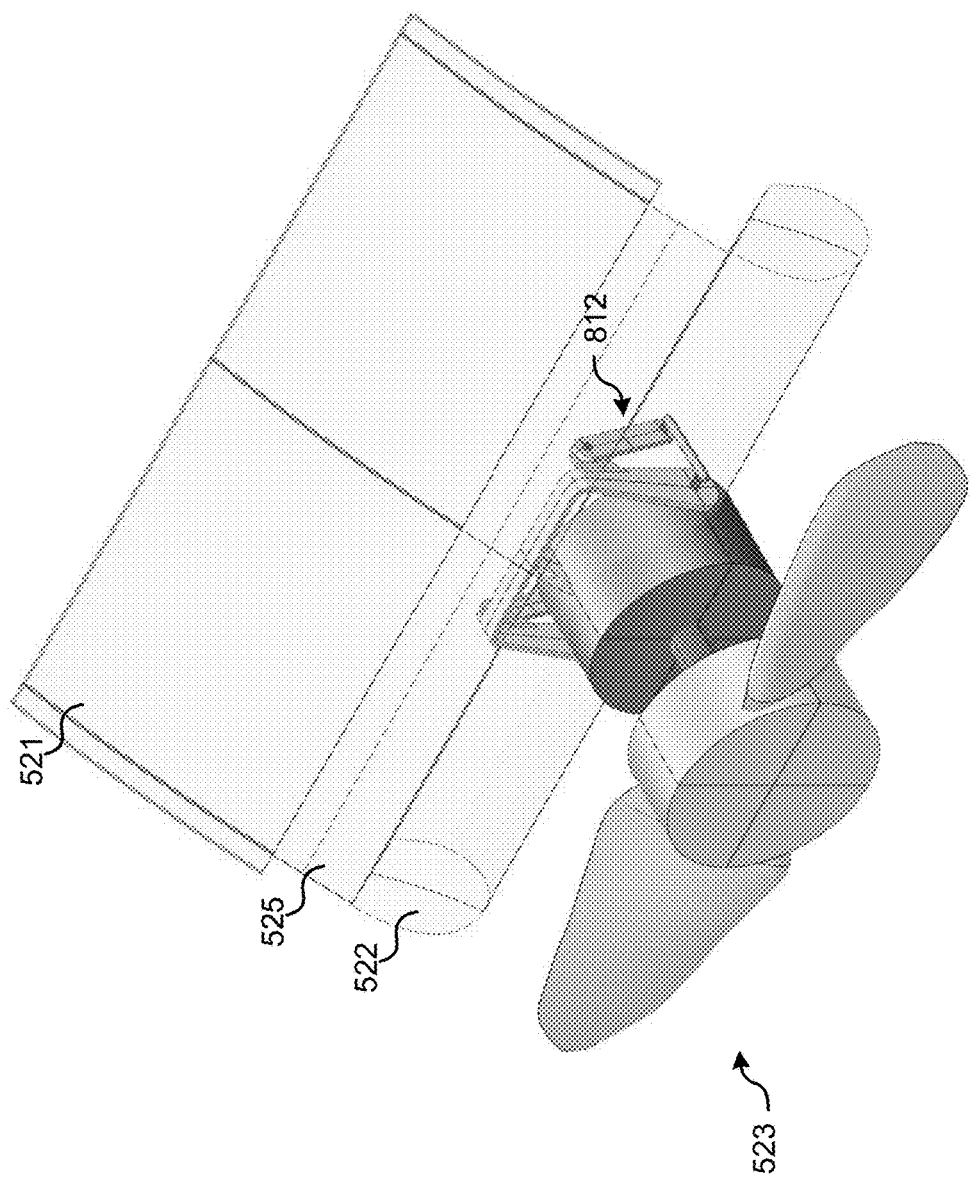
FIG. 18 illustrates an isometric view of a high-lift assembly with a telescoping propeller driveshaft and pivot mechanism in accordance with various embodiments.

FIG. 18 illustrates an isometric view of a high-lift assembly with a telescoping propeller driveshaft and pivot mechanism in accordance with various embodiments. For clarity, the slat nose 522, slat door 521, and the flexible skin 525 between the two are shown as semitransparent, and the surrounding structure and mechanism is not shown. As before this shows both the pivot and the telescoping drive shaft in combination although each could be used independently.

FIG. 19 illustrates a side view detail of a slat nose and motor/propeller in accordance with various embodiments. Particularly, this illustrates the range of motion of lower drive link 628 relative to the slat nose 522 and how this could be used for additional actuation. In this example the link motion is used to pivot the motor an additional 20° counterclockwise relative to the flap nose. In various embodiments, the motor may be attached to the slat with a pivot, such as described above with reference to FIGS. 15-18. Rather than using propeller thrust and a spring to actuate the pivot motion, a torque tube may extend from the link to slat pivot (into the page) and either connect directly to the motor to slat pivot (for a 1:1 ratio), or connect to a bellcrank and connecting rod between the two (for some other gearing ratio of link to motor rotation). Other alternatives include the motor moving linearly away from the slat nose using for example a track with the motion actuated by a rack and pinion gear, with the pinion turned by the lower drive link rotation.

The motion of the drive link around the nose may also, in various embodiments, be used to actuate other mechanical or electro-mechanical devices, individually or in combination. These may include, for example, actuating an electrical switch to power from the motors (e.g., so the motors can't be powered and spinning the propeller when stowed); actuating an electrical switch that activates motor electrical braking and position hold (again, e.g., so the motors can't be powered and spinning the propeller when stowed); actuating a mechanical propeller brake (e.g., to initiate braking of propeller); and actuating a mechanical device to stop the propeller in a particular orientation (e.g., because the propeller only fits in the wing when it is correctly oriented).

Figure 20:
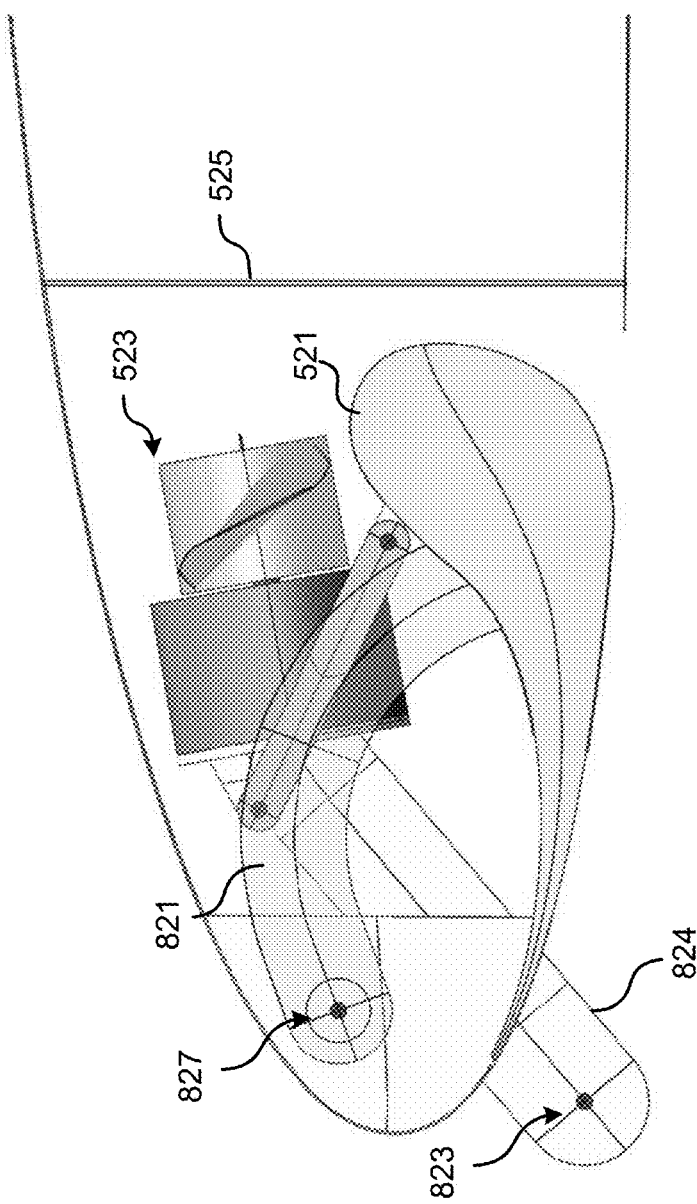
FIG. 20 illustrates a side view of the slat and high-lift assembly in the stowed position in accordance with various embodiments.
Figure 21:
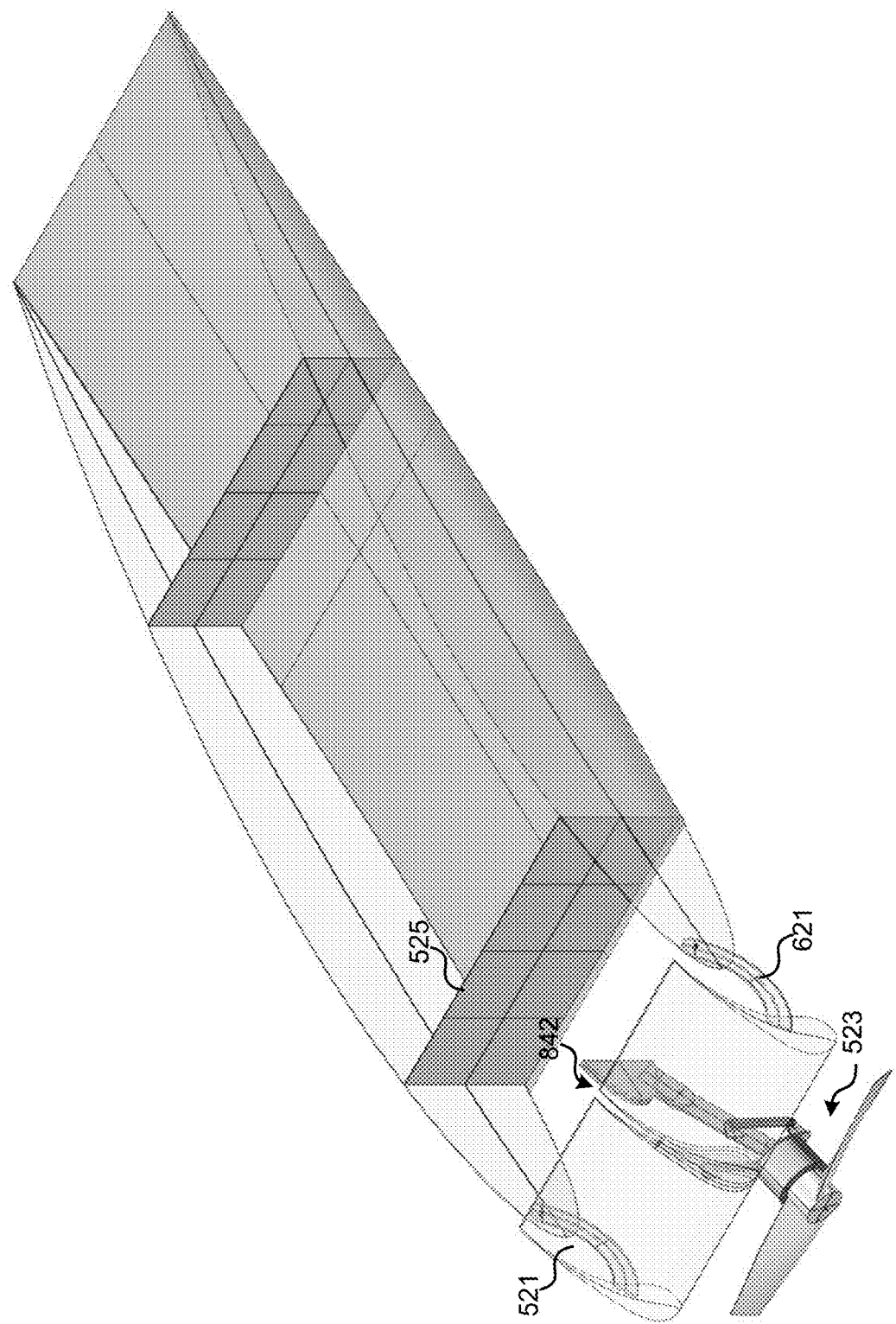
FIG. 21 illustrates an isometric view of the slat and high-lift assembly in the deployed position in accordance with various embodiments.
Figure 22:
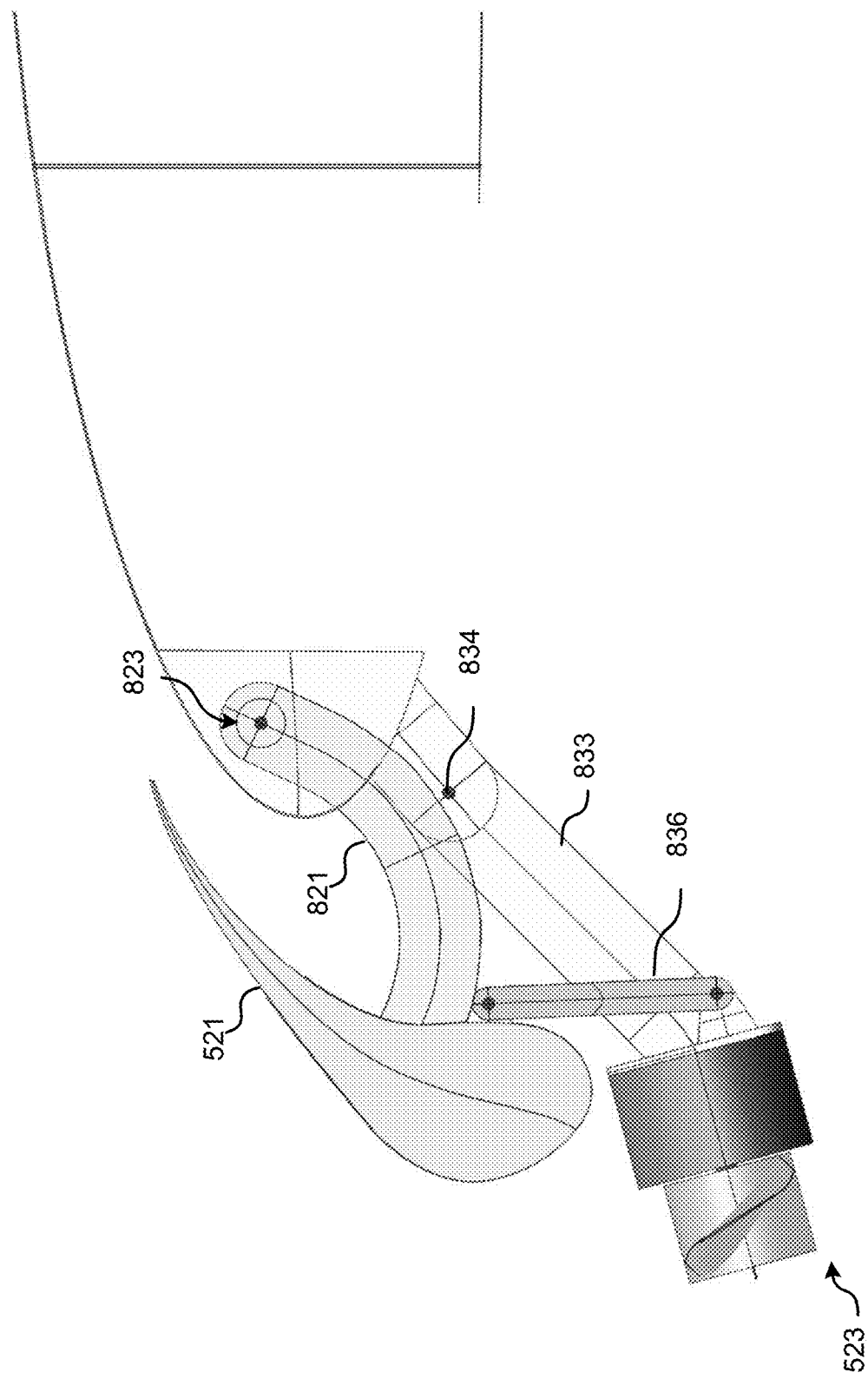
FIG. 22 illustrates a side view of the slat and high-lift assembly in the deployed position in accordance with various embodiments.

FIGS. 20-22 illustrate an example of using offset hinges in accordance with various embodiments. FIG. 20 illustrates a side view of the slat and high-lift assembly in the stowed position in accordance with various embodiments. FIG. 21 illustrates an isometric view of the slat and high-lift assembly in the deployed position in accordance with various embodiments. FIG. 22 illustrates a side view of the slat and high-lift assembly in the deployed position.

This example illustrates an alternative mechanism using offset hinges for deployment. For this option the slat door 521 is one continuous piece (e.g., the slat nose is integrated) and the motor is rigidly attached to a pivoting arm 824 that pivots around motor pivot 823. The motion of the slat door 521 and the motor, which rotate around separate pivot points (motor pivot 823 and slat pivot 827) is mechanically synchronized by a connecting rod 836 between the two. The slat deployment could be actuated by a linear (extending length) actuator between the forward spar and the slat door bracket or motor support bracket (not shown) or by a rotary actuator or torque tube on the slat pivot (not shown). For this mechanism there may be a notch 842 in the trailing edge of the slat 521 at the centerline of the motor to clear the motor pivot bracket during deployment (as shown in FIG. 21).

The connecting rod 836 between the slat and motor may also serve an additional structural purpose by giving a load path from the motor through the slat. For example it could serve as a brace that prevents the motor from moving inboard-outboard (in and out of the page in the left view of FIG. 22). That allows forces in that direction to not be reacted through the motor bracket, which allows it to be thin in the stream wise direction (when viewed the top or front), thereby reducing the drag of the partially external bracket. There are various ways to use the connecting rod as a lateral support, for example the connecting rod between the motor and slat could be angled out in a 'v' viewed from the front.

Alternative embodiments may be implemented to switch the motor connection between the support bracket and the connecting rod, i.e. the motor rigidly attached to the connecting rod 836 and a pin (hinge) connection to the motor support bracket 833, with appropriate adjustments to the pivot points so the propeller may clear the slat nose when deployed. Further embodiments may be implemented in which the motor, fixed either way, is attached to a portion of the slat. Embodiments in which a portion of the slat is fixed to the motor may enable moving the propeller to a position that overlaps the slat vertically. The portion of the slat attached to the motor could be connected to the rest of the slat via a flexible skin, as shown in the folding nose examples (e.g., FIGS. 8-12), or not connected at all and move into place at some deployment angle.

Further embodiments may fixedly couple the motor/propeller assembly rigidly to the slat. This can be configured to eliminate the need for an external bracket 833 or connecting rod 836. Such a configuration may result in more of the compartment being open (not covered by the slat/door) so that the motor and propeller assembly fit through the opening in the compartment.

In the embodiments of FIGS. 20-22, the motor support bracket transmits the thrust of the propeller to the wing structure. The motor mount concepts shown in FIGS. 15-19 could also be applied to this slat configuration of FIGS. 20-22.

Referring back to FIG. 21, a notch 842 in the trailing edge of the slat door 521, may be included to clear the motor pivot during deployment. This view shows a single bay, although embodiments may be implemented include multiple high-lift assemblies 523 in a single wing section, such as, for example, is described above with reference to FIGS. 13 and 14. When the slat nose does not fold it does not need a spanwise gap to clear the slat bracket 621 (e.g. 529) when stowed, and the drive mechanism 517 is not used. Therefore, in this example the slat continues uninterrupted whether the slat brackets 621 are repeated for each bay (between each adjacent propeller) or not. If the slat continued past the end ribs the nose rib (ahead of the forward spar) would have to be notched out to clear the slat when stowed, as shown in FIG. 14.

Although this example illustrates offset hinges with without a folding slat nose configuration, embodiments may be implemented that also utilize offset hinges with a folding slat nose configuration.

FIGS. 23-27 illustrate an embodiment employing a folding nose concept in which the motor is external to the slat and covered by a fairing in accordance with various embodiments. Such embodiments may be configured to place the motor and propeller higher above the slat than might otherwise be possible (e.g., propeller z/c in FIG. 5). As with the folding nose design, the slat deployment could be actuated by a linear (extending length) actuator between the forward spar 526 and the slat door bracket (not shown), or by a rotary actuator or torque tube on the slat door pivot (not shown).

As with previous figures, a single bay is shown although embodiments may be implemented in which the slat door 521 would typically span several bays and have several high-lift assemblies 523 as described above, for example with reference to FIGS. 13 and 14.

Figure 23:
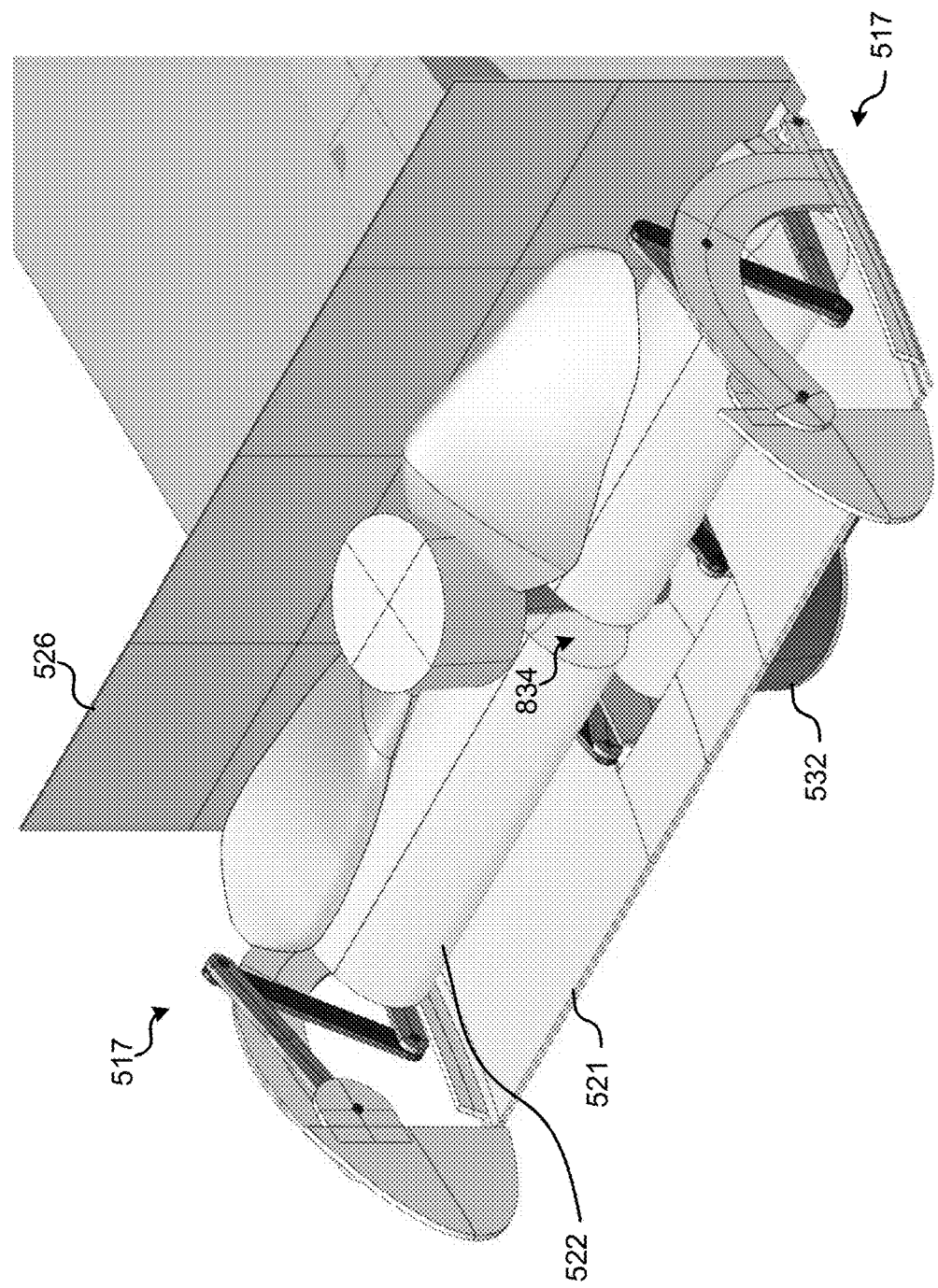
FIG. 23 illustrates an isometric view with the high-lift assembly in the stowed position in accordance with various embodiments.

FIG. 23 illustrates an isometric view with the high-lift assembly in the stowed position in accordance with various embodiments. The motor 532 is below the slat door 521 and the propeller shaft passes through a slot 834 in the slat nose 522 to the interior of the wing. The slat door 521 is cut out around the motor 532, which gives clearance for the motor 532 as it pivots. This cutout, and the motor 532 itself would be enclosed by a fairing fixed to the slat door 521, which is not shown in this figure for clarity. The upper wing skin and ribs are also not shown, for clarity. The deployment mechanism 517 to drive the slat nose folding is shown at the end of the bay. In this example, the same deployment mechanism 517 described above with reference to FIGS. 8-11 is used, although other deployment mechanisms may be implemented.

Figure 24:
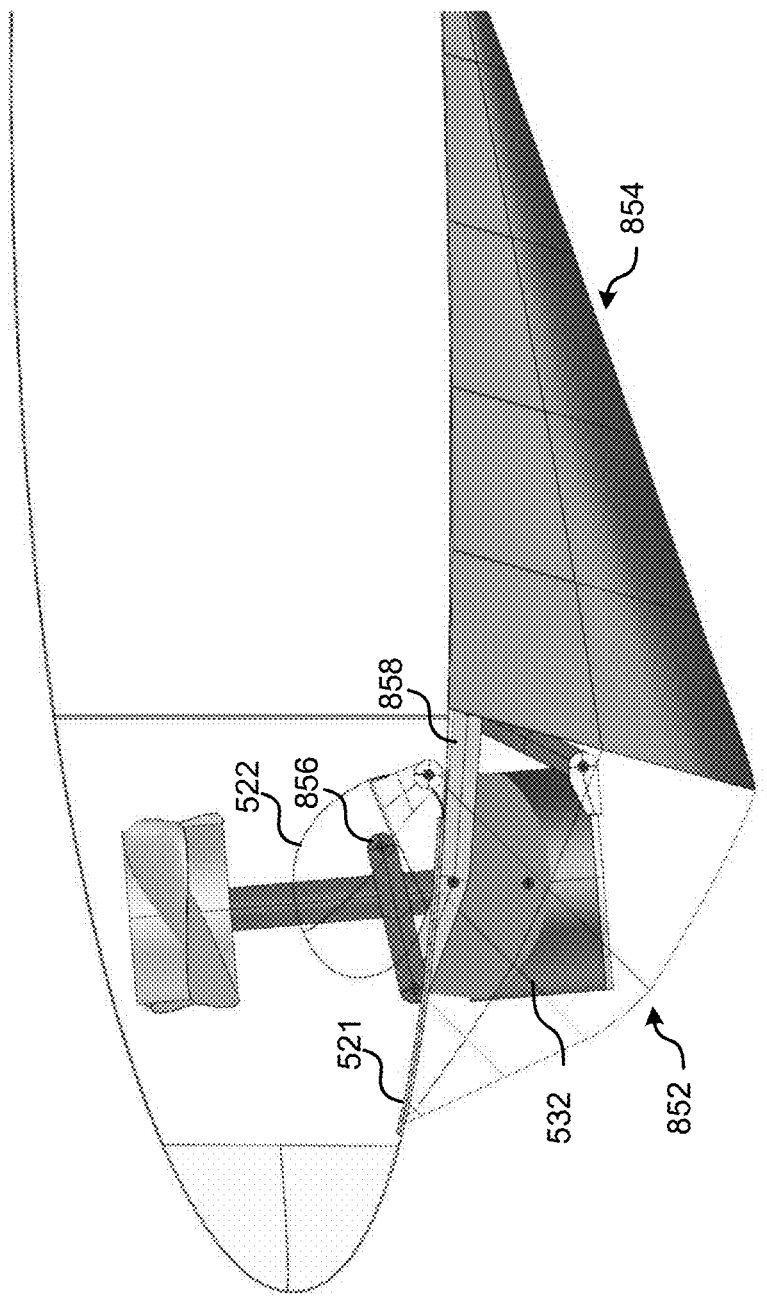
FIG. 24 illustrates a side view with the high-lift assembly in the stowed position in accordance with various embodiments.

FIG. 24 illustrates a side view with the high-lift assembly in the stowed position in accordance with various embodiments. This example illustrates a slat motor fairing 852 and a fixed motor fairing 854, where slat motor fairing 852 is shown as a wireframe outline only, for clarity. Fixed motor fairing 854 is attached to the lower surface of the wing to smoothly close out the aft end of the motor fairing aerodynamically. Motor 532 is attached to slat door 521 by a pivot, which may be driven by a drive link 856 (via bellcrank 858) connected to the slat nose 522 so that the motion of the slat nose 522 unfolding actuates the motor 532 pivoting.

Figure 25:
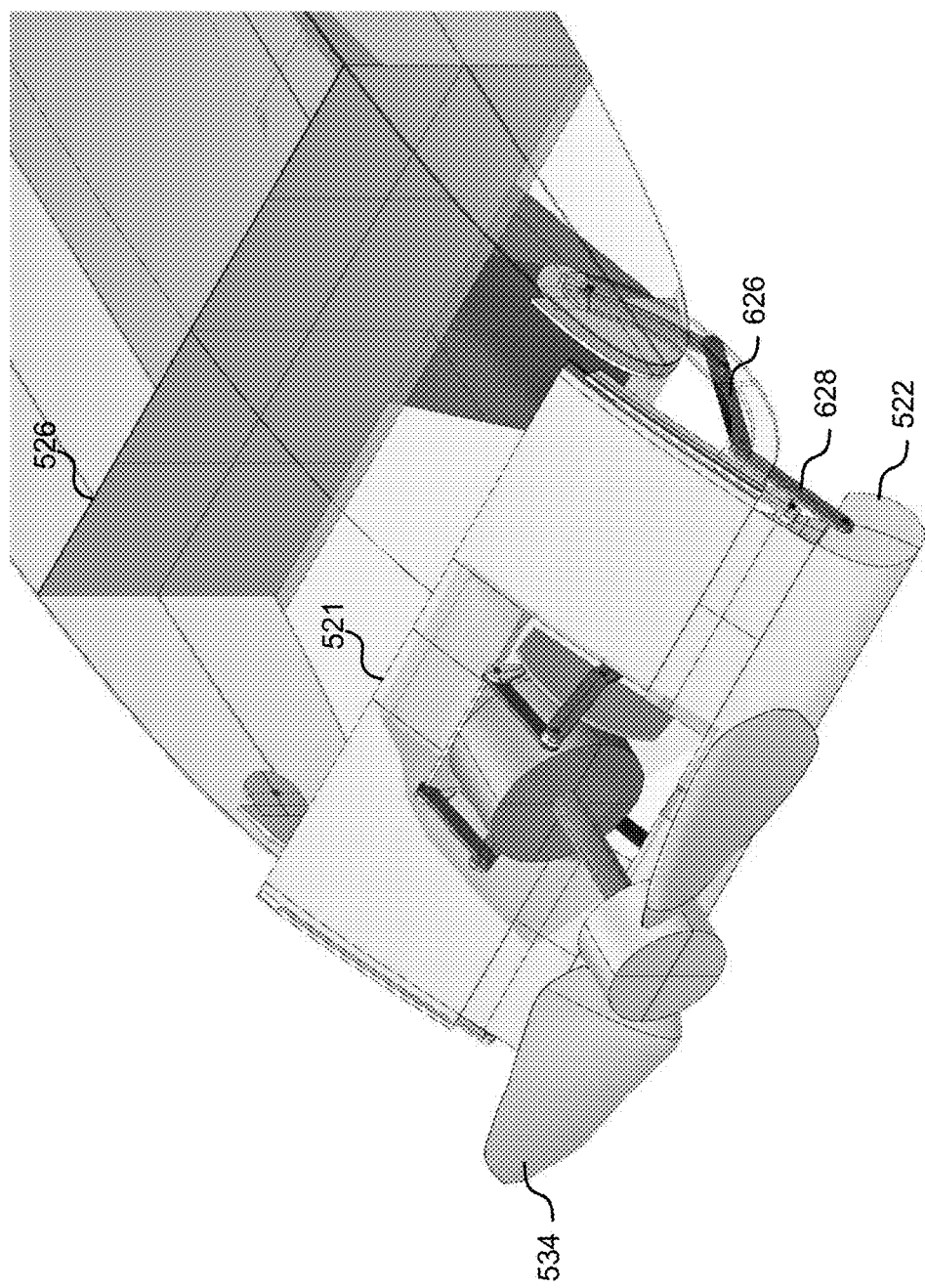
FIG. 25 illustrates an isometric view with the high-lift assembly in the deployed position in accordance with various embodiments.

FIG. 25 illustrates an isometric view with the high-lift assembly in the deployed position. Continuing with this example, motor 532 and propeller 534 have pivoted to be parallel or substantially parallel to the wing chord. Embodiments may be configured such that the motor drive linkages could be adjusted to vary the deployed angle depending on which configuration may be aerodynamically optimal or desirable. During the transition between stowed and deployed positions the propeller shaft passes through slot 834 in slat nose 522, which is mostly hidden behind propeller 534 in this view (see, e.g., FIG. 23), and the motor 532 pivots within the motor fairing fixed to the slat door 521, passing through the hole in the slat door. The forward end of the motor fairing (aft when stowed) is open so that the propeller shaft can pass through. A linkage attached to the slat nose drives the motor pivoting. Only the upper end of that mechanism can be seen in this view.

In this example, the slat nose 522 forms part of the motor drive linkage by transmitting motion from the nose folding drive mechanism at the end of the bay to the motor drive. Embodiments may be implemented in which the mechanism is reversed so that the motor pivoting drives the slat nose folding. Embodiments may also be implemented in which the motor pivoting is driven by a mechanism independent of the slat nose folding, using a similar method, and in that case the slat could be one piece as shown in the external hinge arrangement of FIGS. 20-22. The motor pivoting motion could also be driven by a separate actuator rather than a mechanical linkage in various embodiments.

As described with reference to FIG. 19, the pivoting mechanism and linkages may be used to mechanically or electromechanically activate various controls such as a propeller brake.

Figure 26:
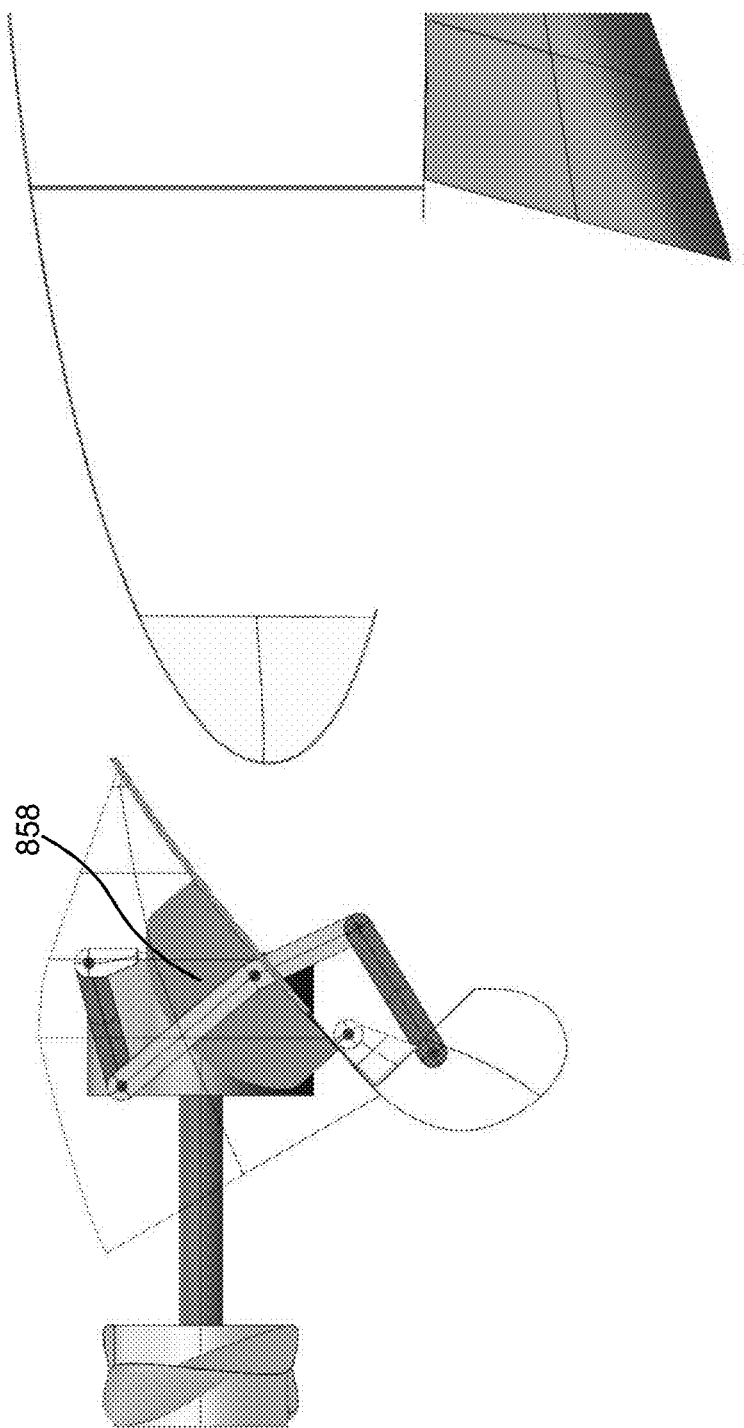
FIG. 26 illustrates a side view of the mechanism in the deployed position in accordance with various embodiments.

FIG. 26 illustrates a side view of the mechanism in the deployed position. As with the folding nose option, this illustration shows a single deployed position, but the mechanism is not limited to a single deployed position and multiple positions may be used for different flight conditions such as, for example, for takeoff and landing. The aft lower portion of motor 532 can be seen passing through the hole in the slat door 521 in this view. In various embodiments, the motor may be spaced farther away from the door so that this hole isn't needed. However, such configurations may require a longer propeller shaft and deeper external fairings.

The mechanism driving the folding nose is not illustrated in this view for clarity and the motor fairing and slat nose are shown as wireframes also for clarity. The linkage driving the motor pivot is attached to the slat nose, which is connected to the motor via an intermediate bellcrank 858. An intermediate bellcrank 858 may be used rather than a direct connection to the nose for more favorable linkage geometry due to the large (e.g., 140°) rotation of the motor between stowed and deployed positions. It may not be needed for some variations (i.e. the slat nose could connect directly to the motor).

Figure 27:
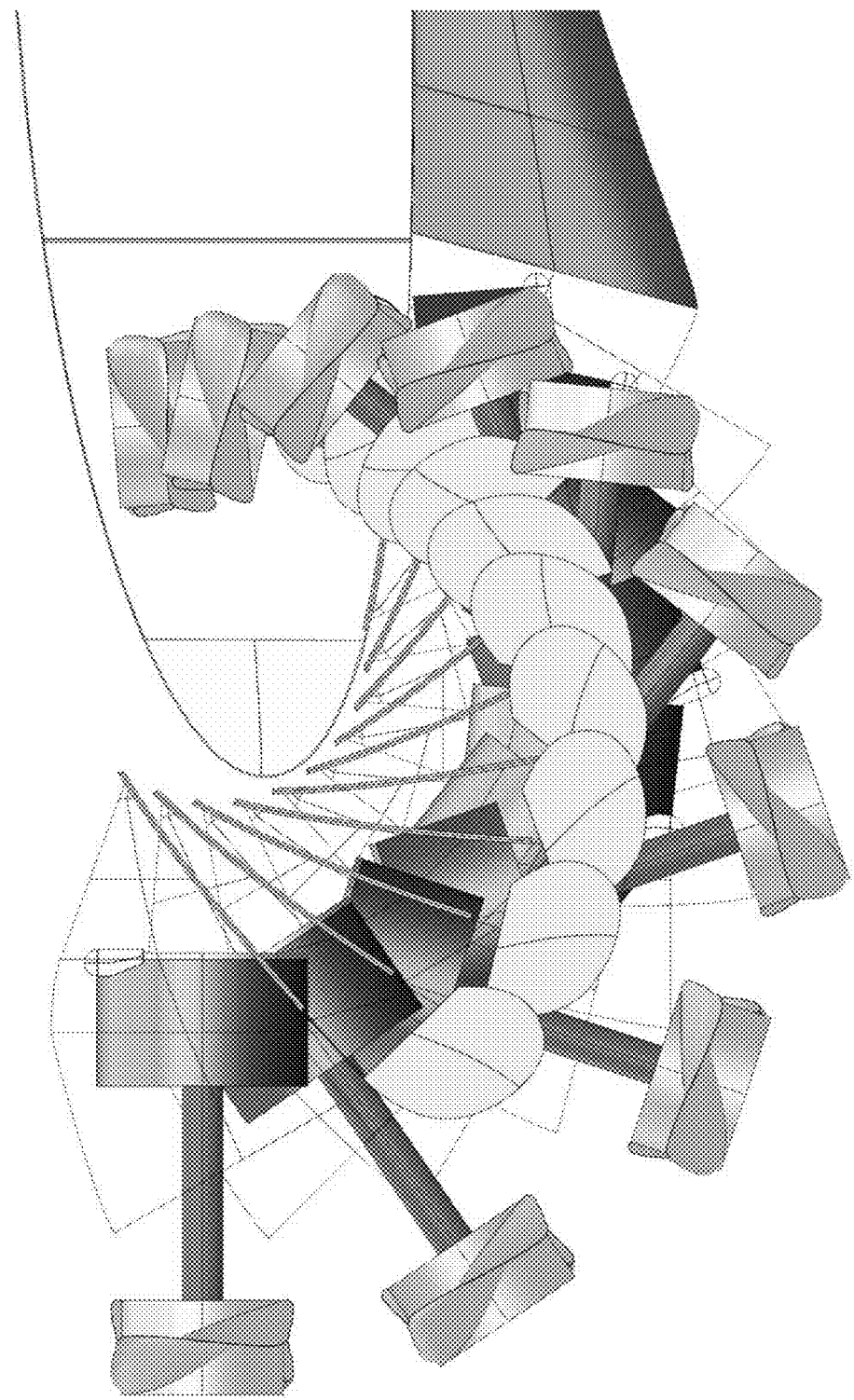
FIG. 27 illustrates a side view showing deployment of the slat door, slat nose and high-lift assembly at each 15° of rotation in accordance with various embodiments.

FIG. 27 illustrates a side view showing deployment of the slat door, slat nose and high-lift assembly at each 15° of rotation in accordance with various embodiments. Linkages and brackets are removed for clarity and the flexible skin connecting the slat nose and slat door is only shown in the fully deployed and stowed position. Similar to the example of FIG. 12, this example shows how the 'schedule' of motor and slat nose rotation versus slat door rotation allows the motor, propeller and slat nose to fit through the opening in the bottom of the wing as well as staying within the compartment formed by the main wing and the forward spar (i.e., the slat nose, motor & propeller doesn't hit the top of the wing or spar as it deploys). The clearance of the propeller from the fixed motor fairing and between the propeller and the slat nose are other constraints that are controlled by the geometry of the mechanical linkage.

Alternative embodiments may be configured to fix the motor rigidly externally to the slat door. In such cases the propeller would also be outside the wing when stowed, and it would therefore have to fold into the motor fairing or fixed fairing in the stowed position. If the propeller diameter were small enough the motor and propeller could be operable in the stowed position. This would require a controllable pitch propeller since the orientation of the propeller reverses between stowed and deployed.

Various example embodiments disclosed herein include a direct drive mechanism in which a motor is directly coupled to a propeller, turning a driveshaft to rotate the propeller. Embodiments may be implemented in which a motor, or other source of motive power, is coupled to one or more propellers by a gearbox or transmission that can change the speed or direction of rotation or both. In various embodiments, the system may be configured with reduction gears such that the electric motor spins faster than the propellers to achieve the efficient operation of the electric motor. It is also noted that it is not necessary that the electric motor axis of rotation be the same as the propellers axis of rotation. That is, the motor or other source of motive force can be mounted transversely and differential gear used to translate the direction of the rotational force.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The term "coupled" refers to direct or indirect joining, connecting, fastening, contacting or linking, and may refer to various forms of coupling such as physical, optical, electrical, fluidic, mechanical, chemical, magnetic, electromagnetic, optical, communicative or other coupling, or a combination of the foregoing. Where one form of coupling is specified, this does not imply that other forms of coupling are excluded. For example, one component physically coupled to another component may reference physical attachment of or contact between the two components (directly or indirectly), but does not exclude other forms of coupling between the components such as, for example, a communications link (e.g., an RF or optical link) also communicatively coupling the two components. Likewise, the various terms themselves are not intended to be mutually exclusive. For example, a fluidic coupling, magnetic coupling or a mechanical coupling, among others, may be a form of physical coupling.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An apparatus for increasing lift of an aircraft lifting surface, comprising:
    a leading-edge assembly;
    a plurality of open propellers, coupled to the leading-edge assembly and configured to be stowed within a compartment of the lifting surface;
    a motor to provide motive force to at least one of the plurality of open propellers; and
    a deployment linkage configured to move the leading-edge assembly and the plurality of open propellers between a deployed configuration and a stowed configuration, wherein in the stowed configuration the plurality of open propellers are stowed within the compartment of the lifting surface and at least a portion of the leading-edge assembly covers the compartment of the lifting surface, and in the deployed configuration the plurality of open propellers are positioned external to the aircraft lifting surface to direct airflow from the plurality of open propellers past the leading-edge assembly.

2. The apparatus of claim 1, wherein the leading-edge assembly comprises a slat nose and a slat door.

3. The apparatus of claim 2, further comprising a flexible hinge disposed between the slat nose and the slat door.

4. The apparatus of claim 2, wherein in the deployed configuration, the plurality of open propellers are positioned below a chord of the aircraft lifting surface and the slat door extends aft and upward from the plurality of open propellers to direct a slipstream from the plurality of open propellers past a surface of the aircraft lifting surface.

5. The apparatus of claim 4, wherein in the deployed configuration, a gap is provided between a trailing edge of the slat door and the upper surface of the aircraft lifting surface.

6. The apparatus of claim 4, wherein in the deployed configuration, there is no gap between a trailing edge of the slat door and the upper surface of the aircraft lifting surface.

7. The apparatus of claim 2, wherein the slat nose is configured with spanwise varying twist distribution across the leading-edge assembly to at least partially compensate for propeller swirl from the plurality of open propellers.

8. The apparatus of claim 2, wherein the slat nose and a slat door comprise a unitary structure.

9. The apparatus of claim 1, wherein a propeller of the plurality of open propellers is pivotably mounted to the leading-edge assembly to enable adjustment of propeller tilt.

10. The apparatus of claim 9, wherein a mount mounting the propeller of the plurality of open propellers to the leading-edge assembly comprises a spring hinge configured to allow the mount to pivot forward in response to the propeller of the plurality of open propellers providing sufficient thrust to overcome a force of the spring hinge.

11. The apparatus of claim 1, wherein a propeller of the plurality of open propellers is mounted to the leading-edge assembly via a telescoping driveshaft.

12. The apparatus of claim 1, wherein the aircraft lifting surface comprises a plurality of bays, and each bay includes a propeller of the plurality of open propellers.

13. The apparatus of claim 1, wherein the motor comprises an electric motor or an internal combustion engine.

14. The apparatus of claim 1, wherein each propeller of the plurality of open propellers is coupled to the leading-edge assembly via a respective propeller mount.

15. The apparatus of claim 14, wherein the propeller mount comprises a gearbox.

16. The apparatus of claim 1, wherein in the deployed configuration the plurality of open propellers are positioned in front of the aircraft lifting surface and the leading-edge assembly extends entirely behind the plurality of open propellers.

17. The apparatus of claim 1, wherein the leading-edge assembly comprises a nose and a flap, wherein the nose folds into the compartment in the stowed configuration.

18. The apparatus of claim 1, wherein in the stowed configuration, at least a portion of the leading-edge assembly that covers the compartment of the lifting surface at least partially forms a bottom of the lifting surface.

* * * * *